US010460492B2

(12) United States Patent
Andronikos et al.

(10) Patent No.: US 10,460,492 B2
(45) Date of Patent: Oct. 29, 2019

(54) METHOD, SYSTEM AND APPARATUS FOR NAVIGATING A VIRTUAL CAMERA USING A NAVIGATION DEVICE

(71) Applicant: CANON KABUSHIKI KAISHA, Tokyo (JP)

(72) Inventors: Nikos James Andronikos, Chatswood (AU); Belinda Margaret Yee, Balmain (AU); Berty Jacques Alain Bhuruth, Bankstown (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/703,616

(22) Filed: Sep. 13, 2017

(65) Prior Publication Data

US 2019/0080495 A1    Mar. 14, 2019

(51) Int. Cl.
*G06T 11/60* (2006.01)
*A63B 71/06* (2006.01)
*G06F 3/0484* (2013.01)

(52) U.S. Cl.
CPC .......... *G06T 11/60* (2013.01); *A63B 71/0622* (2013.01); *A63B 2071/0638* (2013.01); *A63B 2220/806* (2013.01); *G06F 3/04842* (2013.01); *G06F 3/04847* (2013.01)

(58) Field of Classification Search
CPC .. G06T 11/60; G06F 3/04842; G06F 3/04847; A63B 71/0622; A63B 2071/0638; A63B 2220/806
See application file for complete search history.

(56) References Cited

U.S. PATENT DOCUMENTS

| 8,326,442 | B2 | 12/2012 | Amsterdam et al. | |
| 8,576,235 | B1* | 11/2013 | Sumner | G06T 13/20 345/473 |
| 9,070,402 | B2 | 6/2015 | Burtnyk et al. | |
| 9,185,361 | B2 | 11/2015 | Curry | |
| 2004/0085335 | A1 | 5/2004 | Burlnyk et al. | |
| 2013/0345975 | A1* | 12/2013 | Vulcano | G01C 21/3632 701/533 |
| 2014/0043340 | A1* | 2/2014 | Sobhy | G06T 15/10 345/473 |
| 2015/0355717 | A1 | 12/2015 | Bastien et al. | |
| 2017/0153116 | A1* | 6/2017 | Huang | G01C 21/3602 |

* cited by examiner

*Primary Examiner* — Chong Wu
(74) *Attorney, Agent, or Firm* — Canon U.S.A. Inc., IP Division

(57) ABSTRACT

A method of navigating a virtual camera using a navigation device is disclosed. An initial position of the virtual camera capturing at least a portion of a scene is received. The initial position of the virtual camera is associated with an initial camera movement characteristic. A candidate rail is generated based on the initial position of the virtual camera and a change in the scene. The generated candidate rail is associated with a navigation constraint defining movement of the virtual camera along the generated candidate rail. The virtual camera is navigated along the generated candidate rail using the navigation device based on the initial camera movement characteristic and a characteristic defined by the navigation constraint. The constrained navigation is enabled using the navigation device.

19 Claims, 16 Drawing Sheets

METHOD, SYSTEM AND APPARATUS FOR NAVIGATING A VIRTUAL CAMERA USING A NAVIGATION DEVICE

TECHNICAL FIELD

The current invention relates to the field of viewpoint synthesis and, in particular, to a method, system and apparatus for navigating a virtual camera using a navigation device. The current invention also relates to a computer program product including a computer readable medium having recorded thereon a computer program for navigating a virtual camera using a navigation device.

BACKGROUND

Image based rendering allows the synthesis of a virtual viewpoint from a collection of camera images. For example, in an arrangement where a subject is surrounded by a ring of cameras, it is known that a new (virtual camera) view of the subject, corresponding to a position in between (real camera) captured views, may be synthesised from captured views if there is sufficient knowledge of the camera configuration and the scene.

In recent times, the ability to synthesise an arbitrary viewpoint has been promoted for the purpose of "free viewpoint" video. In free viewpoint video, the viewer is able to actively adjust the camera viewpoint to his or her preference within the constraints of the capture system.

Alternatively, sports broadcasters may make use of the synthesis of a virtual viewpoint to enable virtual cameras to broadcast perspectives not possible with physical cameras. Virtual cameras may totally replace physical cameras, or the virtual cameras may be incorporated into existing workflows to supplement physical cameras. As with physical cameras, camera operators control virtual cameras to produce a video stream that is fed to a producer/director's console and is then broadcast to viewers. Therefore, the video stream produced from a virtual camera is of comparable quality to the video stream produced by a physical camera.

Control of a camera, whether physical or virtual, to produce broadcast quality video is extremely challenging. An artistic eye for framing, good hand-eye coordination and fine motor skills are required of operators. Even with these skills, it may be difficult to consistently produce high quality video. A 'Spidercam' camera system is a camera system consisting of a camera rig suspended on wires, the rig being able to move in three dimensions within a limited area above the play of field. A Spidercam camera system is constrained by the requirement for physical wires to not interfere with the state of play. Therefore, a Spidercam camera system could not for example be used to show a players eye view of an arena. In the Spidercam camera system, a camera is mounted to a rig and is able to pan 360 degrees, tilt, and zoom. Spidercam camera systems require two operators, such is the difficulty of producing high quality video. One operator, a pilot, controls the position of the rig (i.e. the x,y,z co-ordinates of the camera within the space of the arena), the second camera operator controls the framing of the video using the orientation controls of pan, tilt, and zoom. The combination of position and orientation makes up the camera 'pose'.

In a virtual camera environment, with free control, the camera may move in any of the three dimensions, while also panning, tilting, and zooming. A virtual camera is not constrained by physical properties and may literally be posed anywhere within the arena (i.e. position can change significantly almost instantly). Such a level of freedom is beyond even a 'Spidercam' camera system.

A need exists for a virtual camera which may be navigated in a manner that is intuitive to a user, while providing broadcast quality framing of events occurring within the arena.

SUMMARY

It is an object of the present invention to substantially overcome, or at least ameliorate, one or more disadvantages of existing arrangements.

In arrangements disclosed below, constraints for a virtual camera are used to simplify the process of navigating the virtual camera within a sports performance arena. The constraints are generated and presented to a human operator who may select to apply the constraints to the virtual camera.

The constraints reduce the degrees of freedom that the virtual camera operates in, and are analogous to physical 'rails' that the camera may move along. Heuristics, such as the state of play, the formation of players, and the ability to apply a constraint to the virtual camera given a current configuration for the virtual camera, are used to generate the constraint. The use of the constraint allows the human operator to capture, in a visually pleasing way, the events unfolding within a sports arena from some starting configuration. The constraints reduce the workload of camera operators, allowing the camera operator to better focus on the task of framing a high quality image.

According to one aspect of the present application, there is provided a method of navigating a virtual camera using a navigation device, the method comprising:

receiving an initial position of the virtual camera capturing at least a portion of a scene, the initial position of the virtual camera being associated with an initial camera movement characteristic;

generating a candidate rail based on the initial position of the virtual camera and a change in the scene, the generated candidate rail being associated with a navigation constraint defining movement of the virtual camera along the generated candidate rail; and navigating the virtual camera along the generated candidate rail using the navigation device based on the initial camera movement characteristic and a characteristic defined by the navigation constraint, the constrained navigation being enabled using the navigation device.

According to another aspect of the present application, there is provided an apparatus for navigating a virtual camera using a navigation device, the apparatus comprising:

means for receiving an initial position of the virtual camera capturing at least a portion of a scene, the initial position of the virtual camera being associated with an initial camera movement characteristic;

means for generating a candidate rail based on the initial position of the virtual camera and a change in the scene, the generated candidate rail being associated with a navigation constraint defining movement of the virtual camera along the generated candidate rail; and means for navigating the virtual camera along the generated candidate rail based on the initial camera movement characteristic and a characteristic defined by the navigation constraint, the constrained navigation being enabled using the navigation device.

According to still another aspect of the present application, there is provided a system of navigating a virtual camera using a navigation device, the system comprising:

a memory for storing data and a computer program;

a processor coupled to the memory for executing the computer program, the computer program having instructions for:

receiving an initial position of the virtual camera capturing at least a portion of a scene, the initial position of the virtual camera being associated with an initial camera movement characteristic;

generating a candidate rail based on the initial position of the virtual camera and a change in the scene, the generated candidate rail being associated with a navigation constraint defining movement of the virtual camera along the generated candidate rail; and navigating the virtual camera along the generated candidate rail based on the initial camera movement characteristic and a characteristic defined by the navigation constraint, the constrained navigation being enabled using the navigation device.

According to still another aspect of the present application, there is provided a computer readable medium having a program stored on the medium for navigating a virtual camera using a navigation device, the program comprising:

code for receiving an initial position of the virtual camera capturing at least a portion of a scene, the initial position of the virtual camera being associated with an initial camera movement characteristic;

code for generating a candidate rail based on the initial position of the virtual camera and a change in the scene, the generated candidate rail being associated with a navigation constraint defining movement of the virtual camera along the generated candidate rail; and code for navigating the virtual camera along the generated candidate rail based on the initial camera movement characteristic and a characteristic defined by the navigation constraint, the constrained navigation being enabled using the navigation device.

According to still another aspect of the present application, there is provided an apparatus for constrained navigation of a virtual camera, the apparatus comprising:

a display device adapted to display a candidate rail generated based on a change in the scene, the generated candidate rail being associated with a candidate navigation constraint defining movement of the virtual camera along the generated candidate rail, wherein the generated candidate rail is displayed based on an initial camera movement characteristic and a characteristic defined by the candidate navigation constraint;

an input device coupled with the display device and configured to receive a user selection of the candidate rail displayed on the display device; and a processor coupled with the input device and the display device, the processor being configured to cause the display device to display the candidate rail and to process the user selection of the candidate rail to facilitate navigation of the virtual camera.

According to still another aspect of the present application, there is provided a method of navigating a virtual camera using a navigation device, the method comprising:

navigating the virtual camera along an initial virtual camera rail, wherein an initial virtual camera rail constrains navigation of the virtual camera; and displaying a rail, in response to a change in a scene, using the navigation device to constrain the navigation of the virtual camera, the rail being generated using at least one characteristic of the scene, wherein the rail is selected for display based on camera movement characteristic at a current virtual camera pose and at least one navigation constraint associated with the generated rail.

According to still another aspect of the present application, there is provided an apparatus for navigating a virtual camera using a navigation device, the apparatus comprising:

means for navigating the virtual camera along an initial virtual camera rail, wherein an initial virtual camera rail constrains navigation of the virtual camera; and means for displaying a rail, in response to a change in a scene, using the navigation device to constrain the navigation of the virtual camera, the rail being generated using at least one characteristic of the scene, wherein the rail is selected for display based on camera movement characteristic at a current virtual camera pose and at least one navigation constraint associated with the generated rail.

According to still another aspect of the present application, there is provided a system for navigating a virtual camera using a navigation device, the system comprising:

code for navigating the virtual camera along an initial virtual camera rail, wherein an initial virtual camera rail constrains navigation of the virtual camera; and code for displaying a rail, in response to a change in a scene, using the navigation device to constrain the navigation of the virtual camera, the rail being generated using at least one characteristic of the scene, wherein the rail is selected for display based on camera movement characteristic at a current virtual camera pose and at least one navigation constraint associated with the generated rail.

According to still another aspect of the present application, there is provided a system for navigating a virtual camera using a navigation device, the system comprising:

a memory for storing data and a computer program;

a processor coupled to the memory for executing the computer program, the computer program having instructions for:

navigating the virtual camera along an initial virtual camera rail, wherein an initial virtual camera rail constrains navigation of the virtual camera; and displaying a rail, in response to a change in a scene, using the navigation device to constrain the navigation of the virtual camera, the rail being generated using at least one characteristic of the scene, wherein the rail is selected for display based on camera movement characteristic at a current virtual camera pose and at least one navigation constraint associated with the generated rail.

According to still another aspect of the present application, there is provided a computer readable medium having a computer program stored on the medium for navigating a virtual camera using a navigation device, the program comprising:

code for navigating the virtual camera along an initial virtual camera rail, wherein an initial virtual camera rail constrains navigation of the virtual camera; and code for displaying a rail, in response to a change in a scene, using the navigation device to constrain the navigation of the virtual camera, the rail being generated using at least one characteristic of the scene, wherein the rail is selected for display based on camera movement characteristic at a current virtual camera pose and at least one navigation constraint associated with the generated rail.

Other aspects are also disclosed.

BRIEF DESCRIPTION OF THE DRAWINGS

One or more embodiments of the invention will now be described with reference to the following drawings, in which.

DETAILED DESCRIPTION INCLUDING BEST MODE

One method of simplifying control of the virtual camera is to apply constrains that limit the number of dimensions in which a virtual camera may be controlled. When the constraints are applied, the controls for the virtual camera are simplified.

An example of a constraint for a physical camera is a physical camera rail along which the camera dolly travels. A camera operator has the option of moving the camera forwards or backwards along the physical camera rail, which affects the position of the camera in the world in a consistent way, with no effect on orientation of the camera pose.

Virtual camera rail constraints are similar in that the virtual camera rail constraints allow the camera operator to move forwards and backwards along the rail. However, virtual camera rail constraints have advantages over physical camera rail constraints because the virtual rails are not limited by having a physical presence that may interfere with a game if the camera rail constraints are placed improperly. The removal of the limitation means that the number of possible configurations for virtual camera rail constraints is nearly limitless.

Figure 1:
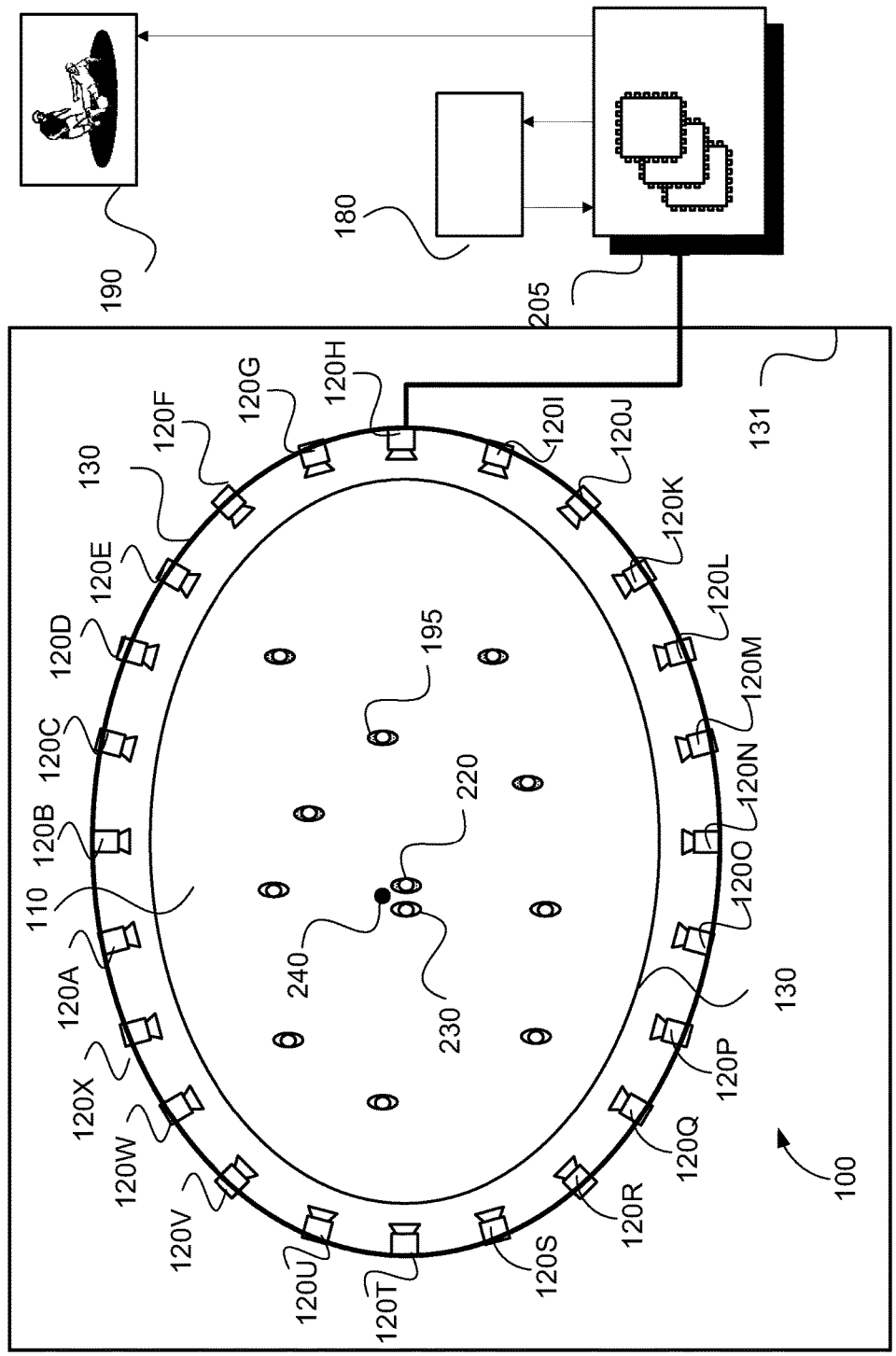
FIG. 1 is a top down view of a performance arena during a soccer match.

Arrangements described herein are adapted for use in the context of a sports or similar performance arena as shown for example in FIG. 1. As seen in FIG. 1, arena 110 is centred on a playing field that is approximately rectangular, oval or circular, allowing the arena 110 to be surrounded by one or more rings of cameras 120A-120X. As seen in FIG. 1, the arena 110 includes a single ring of cameras 120A-120X. Each of the cameras 120A-120X is physically located at a respective predetermined location with respect to the the arena 110. The arena 110, in the example of FIG. 1, contains players from a first team (e.g. 150) and a second team (e.g. 160) and a ball 140. In the example of FIG. 1, the player 150 may be represented by a first object, the player 160 may be represented by a second object and the ball 140 by a third object.

The cameras 120A-120X of the ring of cameras shown in FIG. 1 are synchronised to capture frames at the same instants in time so that all points on the playing field defined by the arena 110 are captured simultaneously from a large number of points of view (or viewpoints).

In some variations, the full ring of cameras as shown in FIG. 1 is not used, but rather some subset(s) of the ring of cameras may be used. Arrangements where some subset of the ring of cameras of FIG. 1 is used may be advantageous when certain points of view (or viewpoints) are predetermined to be unnecessary ahead of time. In one arrangement, not all cameras are evenly located. Some of the cameras may be arbitrarily located at any known position within the arena 110.

Figure 2A:
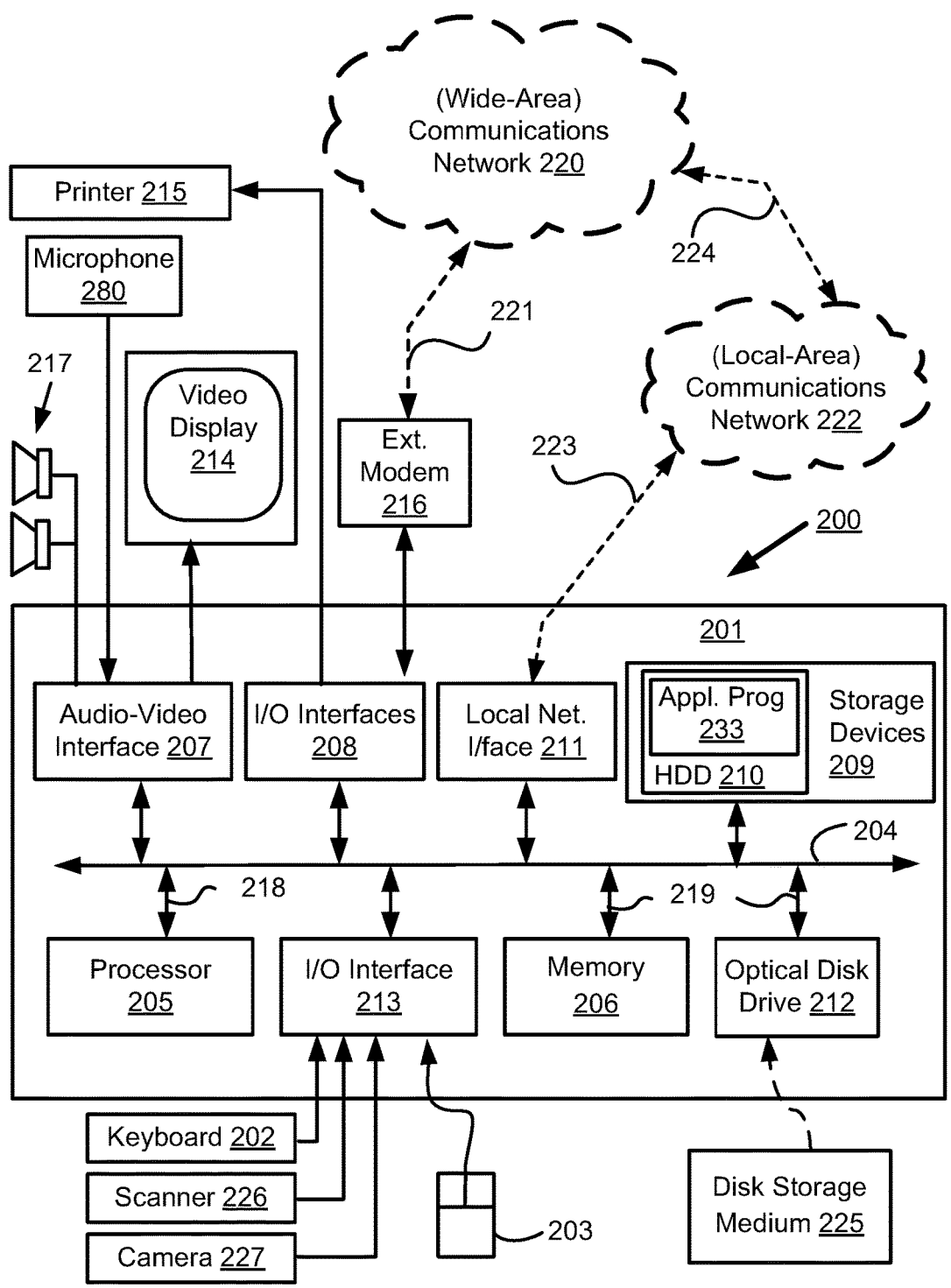
FIGS. 2A and 2B form a schematic block diagram of a general purpose computer system on which arrangements may be practised.

Video frames captured by a camera, such as the camera 120A, are subject to processing and temporary storage near the camera 120A prior to being made available, via a network connection 130, to a processing unit 205 (see FIGS. 2A and 2B) configured for performing video processing. As seen in FIG. 2A, the processing unit 205 is configured within a computer module 201. However, in an alternative arrangement, a separate video processing unit may be used to implement the described arrangements.

The processing unit 205 may be configured to receive controlling input from a controller 180 that specifies the position of a virtual camera within the arena 110. The processing unit 205 synthesises a specified camera viewpoint 190 based on video streams available to the processing unit 205 from the cameras 120A-120X surrounding the arena 110 and a pose of a virtual camera. The virtual camera position input may be generated by a human virtual camera operator and be based on input from a user interface device such as a joystick, mouse 203 (see FIG. 2A) or similar controller including dedicated controllers comprising multiple input components. Alternatively, the camera pose may be generated fully automatically based on analysis of game play. Hybrid control configurations are also possible whereby some aspects of the camera pose are directed by a human operator and others by an automated algorithm. For example, coarse posing may be performed by a human operator and fine posing, including stabilisation and path smoothing may be performed by an automated algorithm.

The processing unit 205 may be configured to achieve frame synthesis using any suitable image based rendering method. Image based rendering methods may be based on sampling pixel data from a set of cameras of known geometric arrangement and combining the sampled pixel data into a synthesised frame. In addition to sample based rendering a requested frame, the processing unit 205 may be additionally configured to perform synthesis, 3D modelling, in-painting or interpolation of regions as required to cover sampling deficiencies and to create frames of high quality visual appearance. The processing unit 205 may also be configured to provide feedback in the form of the frame quality or the completeness of camera coverage for the requested viewpoint so that the device generating the camera pose control signal can be aware of the practical bounds of the processing unit 205. Video streams 190 created by the computational video processing unit may subsequently be provided to a production desk (not depicted) where the video streams 190 can be edited together to form a broadcast video. Alternatively, the video streams 190 may be broadcast unedited or stored for later compilation.

Figure 2B:
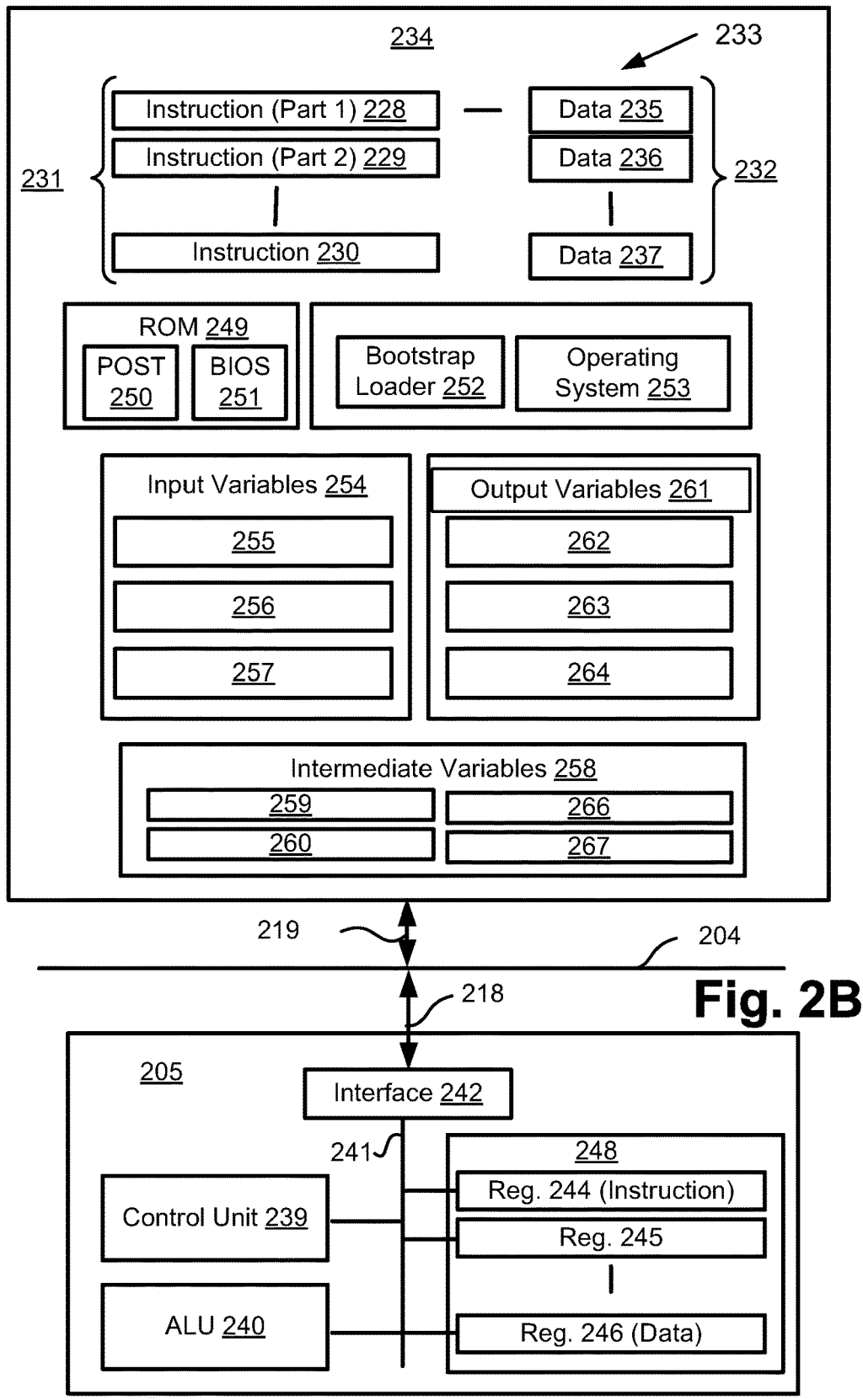

FIGS. 2A and 2B depict a general-purpose computer system 200, upon which the various arrangements described can be practiced.

As seen in FIG. 2A, the computer system 200 includes: the computer module 201; input devices such as a keyboard 202, a mouse pointer device 203, a scanner 226, a camera 120A-120X, and a microphone 280; and output devices including a printer 215, a display device 214 and loudspeakers 217. An external Modulator-Demodulator (Modem) transceiver device 216 may be used by the computer module 201 for communicating to and from a communications network 220 via a connection 221. The communications network 220 may be a wide-area network (WAN), such as the Internet, a cellular telecommunications network, or a private WAN. Where the connection 221 is a telephone line, the modem 216 may be a traditional "dial-up" modem. Alternatively, where the connection 221 is a high capacity (e.g., cable) connection, the modem 216 may be a broadband modem. A wireless modem may also be used for wireless connection to the communications network 220.

The computer module 201 typically includes at least the processing unit 205, and a memory unit 206. For example, the memory unit 206 may have semiconductor random access memory (RAM) and semiconductor read only memory (ROM). The computer module 201 also includes an number of input/output (I/O) interfaces including: an audio-video interface 207 that couples to the video display 214, loudspeakers 217 and microphone 280; an I/O interface 213 that couples to the keyboard 202, mouse 203, scanner 226, camera 227 and optionally a joystick or other human interface device (not illustrated); and an interface 208 for the external modem 216 and printer 215. In some implementations, the modem 216 may be incorporated within the computer module 201, for example within the interface 208. The computer module 201 also has a local network interface 211, which permits coupling of the computer system 200 via a connection 223 to a local-area communications network 222, known as a Local Area Network (LAN). As illustrated in FIG. 2A, the local communications network 222 may also couple to the wide network 220 via a connection 224, which would typically include a so-called "firewall" device or device of similar functionality. The local network interface 211 may comprise an Ethernet circuit card, a Bluetooth® wireless arrangement or an IEEE 202.11 wireless arrangement; however, numerous other types of interfaces may be practiced for the interface 211.

The I/O interfaces 208 and 213 may afford either or both of serial and parallel connectivity, the former typically being implemented according to the Universal Serial Bus (USB) standards and having corresponding USB connectors (not illustrated). Storage devices 209 are provided and typically include a hard disk drive (HDD) 210. Other storage devices such as a floppy disk drive and a magnetic tape drive (not illustrated) may also be used. An optical disk drive 212 is typically provided to act as a non-volatile source of data. Portable memory devices, such optical disks (e.g., CD-ROM, DVD, Blu-Ray Disc™), USB-RAM, portable, external hard drives, and floppy disks, for example, may be used as appropriate sources of data to the system 200.

The components 205 to 213 and 170 of the computer module 201 typically communicate via an interconnected bus 204 and in a manner that results in a conventional mode of operation of the computer system 200 known to those in the relevant art. For example, the processor 205 is coupled to the system bus 204 using a connection 218. Likewise, the memory 206 and optical disk drive 212 are coupled to the system bus 204 by connections 219. Examples of computers on which the described arrangements can be practised include IBM-PC's and compatibles, Sun Sparcstations, Apple Mac™ or like computer systems.

Methods described herein may be implemented using the computer system 200 wherein the processes of FIGS. 3 to 15 to be described, may be implemented as one or more software application programs 233 executable within the computer system 200. In particular, the steps of the described methods are effected by instructions 231 (see FIG. 2B) in the software 233 that are carried out within the computer system 200. The software instructions 231 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software 233 is typically stored in the HDD 210 or the memory 206. The software is loaded into the computer system 200 from the computer readable medium, and then executed by the computer system 200. Thus, for example, the software 233 may be stored on an optically readable disk storage medium (e.g., CD-ROM) 225 that is read by the optical disk drive 212. A computer readable medium having such software or computer program recorded on the computer readable medium is a computer program product. The use of the computer program product in the computer system 200 preferably effects an advantageous apparatus for implementing the described methods.

In some instances, the application programs 233 may be supplied to the user encoded on one or more CD-ROMs 225 and read via the corresponding drive 212, or alternatively may be read by the user from the networks 220 or 222. Still further, the software can also be loaded into the computer system 200 from other computer readable media. Computer readable storage media refers to any non-transitory tangible storage medium that provides recorded instructions and/or data to the computer system 200 for execution and/or processing. Examples of such storage media include floppy disks, magnetic tape, CD-ROM, DVD, Blu-Ray™ Disc, a hard disk drive, a ROM or integrated circuit, USB memory, a magneto-optical disk, or a computer readable card such as a PCMCIA card and the like, whether or not such devices are internal or external of the computer module 201. Examples of transitory or non-tangible computer readable transmission media that may also participate in the provision of software, application programs, instructions and/or data to the computer module 201 include radio or infra-red transmission channels as well as a network connection to another computer or networked device, and the Internet or Intranets including e-mail transmissions and information recorded on Websites and the like.

The second part of the application programs 233 and the corresponding code modules mentioned above may be executed to implement one or more graphical user interfaces (GUIs) to be rendered or otherwise represented upon the display 214. Through manipulation of typically the keyboard 202 and the mouse 203, a user of the computer system 200 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 217 and user voice commands input via the microphone 280.

FIG. 2B is a detailed schematic block diagram of the processor 205 and a "memory" 234. The memory 234 represents a logical aggregation of all the memory modules (including the HDD 209 and semiconductor memory 206) that can be accessed by the computer module 201 in FIG. 2A.

When the computer module 201 is initially powered up, a power-on self-test (POST) program 250 executes. The POST program 250 is typically stored in a ROM 249 of the semiconductor memory 206 of FIG. 2A. A hardware device such as the ROM 249 storing software is sometimes referred to as firmware. The POST program 250 examines hardware within the computer module 201 to ensure proper functioning and typically checks the processor 205, the memory 234 (809, 206), and a basic input-output systems software (BIOS) module 251, also typically stored in the ROM 249, for correct operation. Once the POST program 250 has run successfully, the BIOS 251 activates the hard disk drive 210 of FIG. 2A. Activation of the hard disk drive 210 causes a bootstrap loader program 252 that is resident on the hard disk drive 210 to execute via the processor 205. This loads an operating system 253 into the RAM memory 206, upon which the operating system 253 commences operation. The operating system 253 is a system level application, executable by the processor 205, to fulfil various high level functions, including processor management, memory management, device management, storage management, software application interface, and generic user interface.

The operating system 253 manages the memory 234 (809, 206) to ensure that each process or application running on the computer module 201 has sufficient memory in which to execute without colliding with memory allocated to another process. Furthermore, the different types of memory available in the system 200 of FIG. 2A must be used properly so that each process can run effectively. Accordingly, the aggregated memory 234 is not intended to illustrate how particular segments of memory are allocated (unless otherwise stated), but rather to provide a general view of the memory accessible by the computer system 200 and how such is used.

As shown in FIG. 2B, the processor 205 includes a number of functional modules including a control unit 239, an arithmetic logic unit (ALU) 240, and a local or internal memory 248, sometimes called a cache memory. The cache memory 248 typically includes a number of storage registers 244-246 in a register section. One or more internal busses 241 functionally interconnect these functional modules. The processor 205 typically also has one or more interfaces 242 for communicating with external devices via the system bus 204, using a connection 218. The memory 234 is coupled to the bus 204 using a connection 219.

The application program 233 includes a sequence of instructions 231 that may include conditional branch and loop instructions. The program 233 may also include data 232 which is used in execution of the program 233. The instructions 231 and the data 232 are stored in memory locations 228, 229, 230 and 235, 236, 237, respectively. Depending upon the relative size of the instructions 231 and the memory locations 228-830, a particular instruction may be stored in a single memory location as depicted by the instruction shown in the memory location 230. Alternately, an instruction may be segmented into a number of parts each of which is stored in a separate memory location, as depicted by the instruction segments shown in the memory locations 228 and 229.

In general, the processor 205 is given a set of instructions which are executed therein. The processor 205 waits for a subsequent input, to which the processor 205 reacts to by executing another set of instructions. Each input may be provided from one or more of a number of sources, including data generated by one or more of the input devices 202, 203, data received from an external source across one of the networks 220, 202, data retrieved from one of the storage devices 206, 209 or data retrieved from a storage medium 225 inserted into the corresponding reader 212, all depicted in FIG. 2A. The execution of a set of the instructions may in some cases result in output of data. Execution may also involve storing data or variables to the memory 234.

The disclosed arrangements use input variables 254, which are stored in the memory 234 in corresponding memory locations 255, 256, 257. The disclosed arrangements produce output variables 261, which are stored in the memory 234 in corresponding memory locations 262, 263, 264. Intermediate variables 258 may be stored in memory locations 259, 260, 266 and 267.

Referring to the processor 205 of FIG. 2B, the registers 244, 245, 246, the arithmetic logic unit (ALU) 240, and the control unit 239 work together to perform sequences of micro-operations needed to perform "fetch, decode, and execute" cycles for every instruction in the instruction set making up the program 233. Each fetch, decode, and execute cycle comprises:

a fetch operation, which fetches or reads an instruction 231 from a memory location 228, 229, 230;

a decode operation in which the control unit 239 determines which instruction has been fetched; and an execute operation in which the control unit 239 and/or the ALU 240 execute the instruction.

Thereafter, a further fetch, decode, and execute cycle for the next instruction may be executed. Similarly, a store cycle may be performed by which the control unit 239 stores or writes a value to a memory location 232.

Figure 3:
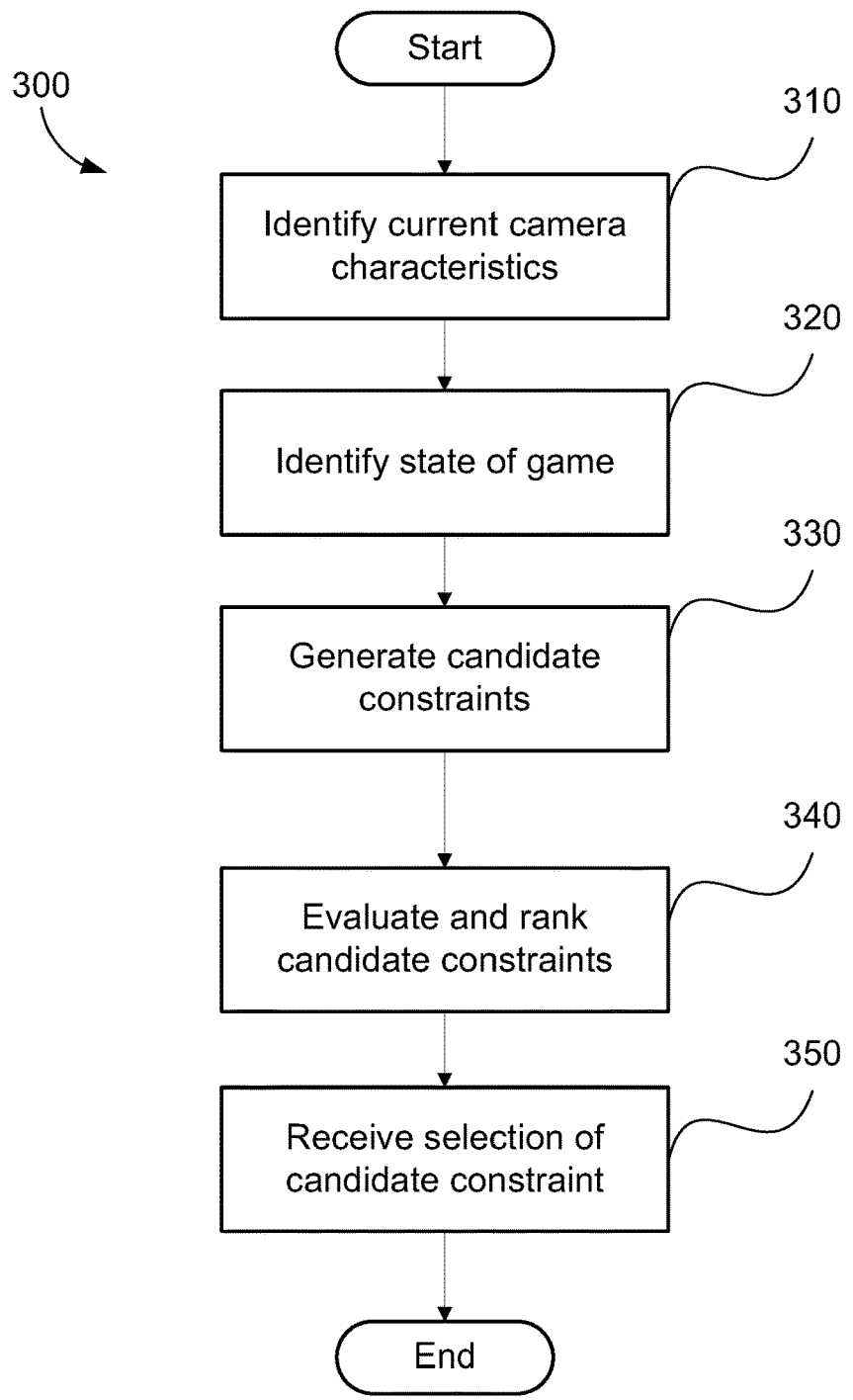
FIG. 3 is a schematic flow diagram showing a method of generating constraints.
Figure 4:
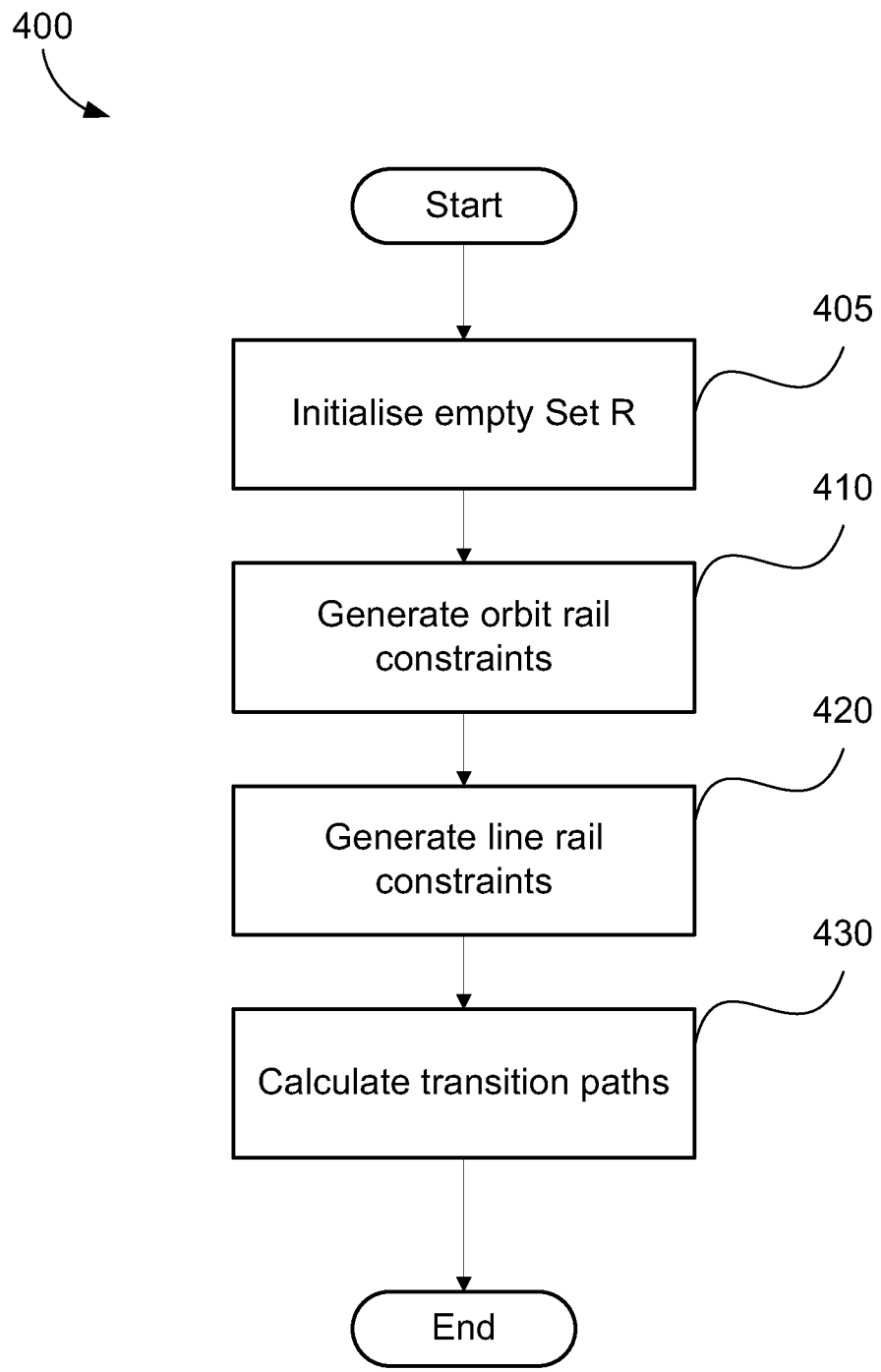
FIG. 4 is a schematic flow diagram showing a method of generating orbital rail constraints, line rail constraints, and transition path constraints as used in the method of FIG. 3.
Figure 5:
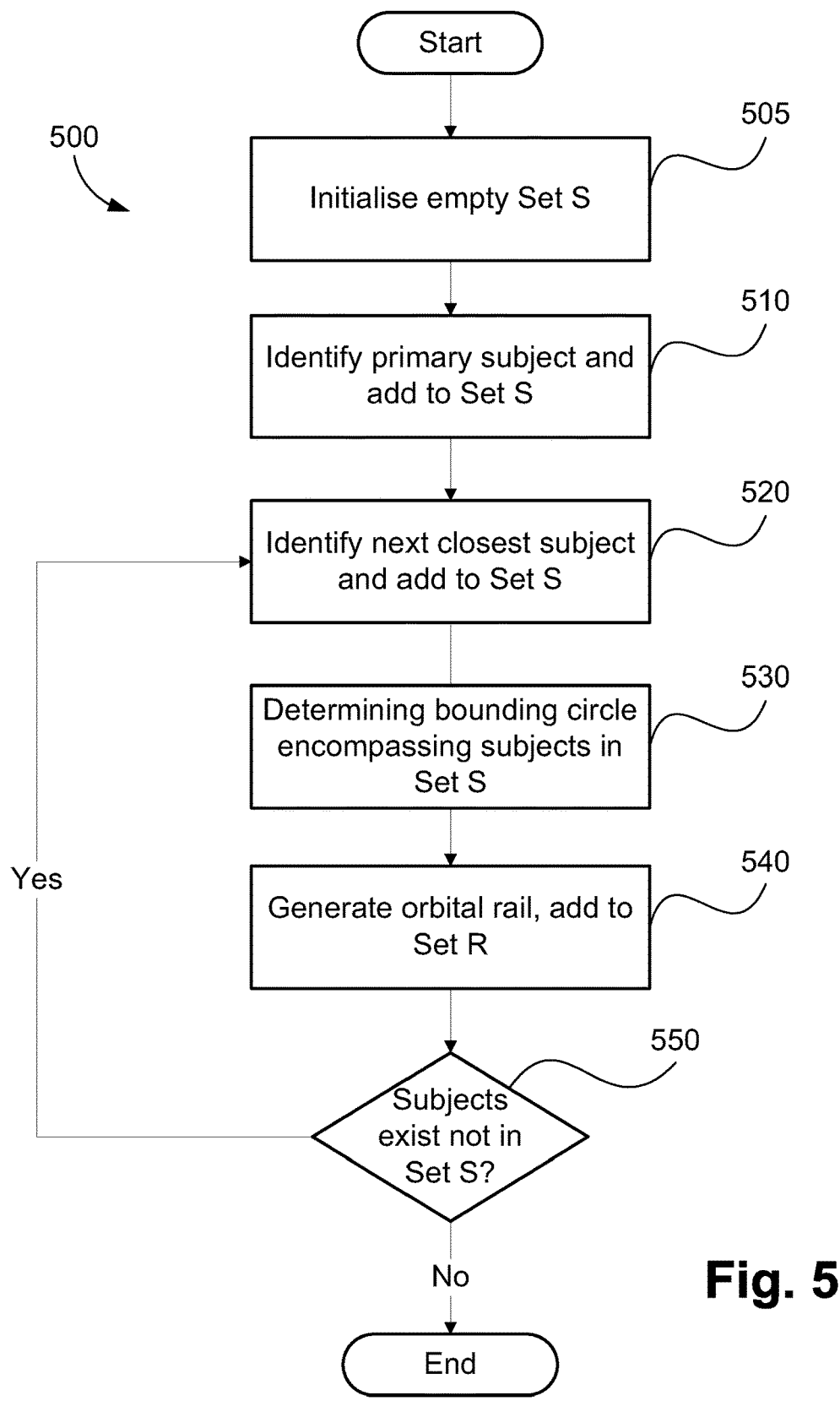
FIG. 5 is a schematic flow diagram showing a method of generating orbital rail constraints as used in the method of FIG. 4.

Each step or sub-process in the processes of FIGS. 3 to 5 is associated with one or more segments of the program 233 and is performed by the register section 244, 245, 247, the ALU 240, and the control unit 239 in the processor 205 working together to perform the fetch, decode, and execute cycles for every instruction in the instruction set for the noted segments of the program 233.

The described methods may alternatively be implemented in dedicated hardware such as one or more integrated circuits performing the functions or sub functions of the described arrangements. For example, the described methods may be implemented using dedicated hardware forming a video processing unit. Such dedicated hardware may include graphic processors, digital signal processors, or one or more microprocessors and associated memories.

The extreme flexibility afforded by the arrangement of FIG. 1 described above and "free viewpoint" virtual cameras, allow camera operators to have greater freedom in control than with physical cameras. Virtual cameras may move in any dimension in space. The virtual cameras may also pan, tilt, and zoom, and may have some control of time. For example, the virtual cameras may pause time, move backwards in time, etc. However, the workload of controlling a virtual camera may be greater than with a physical camera, where at a sporting event the physical camera is usually physically limited in range of movement in some way. Virtual cameras may make it more difficult for camera operators to follow the events of the sports performance and apply artistic touches, such as fine tuning the framing.

The difficulties of controlling a virtual camera may be alleviated through the use of constraints that limit the number of dimensions that the operator has control over. A constraint may be used to map multiple dimensions, each with individual controls, to a single input. For example, a rail constraint dictates the position in space of the virtual camera and the operator may move forwards or backwards along the rail. Thus, the control of the position of the camera in space is simplified to a single forwards or backwards choice. The constraint provides a significant simplification of navigation controls and subsequently of cognitive load on the operator. However, use of constraints may require the camera operator to decide upon constraints that best provide the potential for presenting the state of an event occurring in the performance arena 110.

Virtual constraints are not bound by physical limitations and will not interfere with the players or ball, so the virtual constraints may be placed anywhere. The number of constraints at any one time may therefore be sufficient that choosing between the constraints or processing the constraints within a computer system becomes a problem.

Methods described below seek to address the above problems of virtual cameras.

Methods described below may be used to generate constraints for virtual cameras. Virtual cameras may operate in 3D Euclidean space over a time range. A camera operator may manipulate the virtual camera to navigate the position (X, Y, Z) and orientation (pan, tilt, roll) in the spatial domain and the field of view (zoom) of the virtual camera. Each of the position, orientation and spatial domain attributes may be controlled via the methods described below. Some of the position, orientation and spatial domain attributes may be configured with a static or constant value. Some of the position, orientation and spatial domain attributes may be mapped onto one or more external device controllers such as joysticks, dials, or buttons to support human control. Further, some of the position, orientation and spatial domain attributes may be mapped onto software modules to support automated control of a virtual camera.

Constraints refer to any imposed restrictions on changes to navigation dimensions. Constraints may be classified with a variety of forms, such as mapping constraints, dynamic mapping constraints, mapped range constraints and alternative geometry constrains. In general, mapping constraints may refer to interpretation of a user input using a logic (or method) for handling that particular user input. Therefore, if there is no logic assigned to handle a particular user input, i.e. no handler is defined for the user input, no navigation is performed in response to such an input and the virtual camera remains stationary. On the other hand, dynamic mapping constraints define whether the logic handling the user input is enabled or disabled. Thus, when the logic assigned to handle a user input is disabled, the virtual camera remains stationary in response to the user input. When the logic is enabled, the virtual camera is navigated in accordance with the user input and the logic assigned to handle such an input.

Alternative geometry constraints generally refer to constraints which impose a geometric abstraction on the navigation dimensions. Such geometric abstractions abstract position and orientation navigation dimensions such that possibly a single two-dimensional or one-dimensional user input is translated into tree-dimensional movements along x, y, z axes. In particular, a logic assigned to handle a user input for a particular geometry constraint uses a user input and geometry data corresponding to the geometry constraint to determine a displacement vector for the virtual camera in response to the user input. In case of an orbital constraint, navigation of the virtual camera may be achieved by determining a displacement angle in a cylindrical or spherical co-ordinate system using the user input. For example, an orbital constraint allows movements of the virtual camera along a selected orbit such that user inputs or navigation commands are translated into displacements along the orbit of the virtual camera while maintaining an object of interest in the field of view or in the center of the orbit. As such, an orbital rail constraint abstracts position and orientation navigation dimensions as a cylindrical or spherical co-ordinate system.

Mapped range constraints may impose range limits on virtual camera movements. The mapped range constraints may be used in addition to other defined constraints for virtual camera navigation. For example, mapped range constraints may be specified in addition to an alternative geometry constraint. A straight line constraint, being an example of an alternative geometry constraint, may be defined for moving a virtual camera, however, in addition to the straight line constraint, rotation limits may be imposed for rotating camera about x, y or z axes. Such rotation limits are considered as mapped range constraints. Furthermore, the line constraint may be further limited in its length using a mapped range constraint.

For example, a rail constraint is a specific type of alternative geometry constraint where the geometric abstraction is a three dimensional plane navigable across two dimensions. A first input moves the virtual camera in a first direction on the rail, and a second input, mutually exclusive to the first, moves the virtual camera in the opposite direction along the rail. A third input moves the virtual camera in one direction perpendicular to the first direction and a fourth input mutually exclusive to the third, moves the virtual camera in the other direction perpendicular to the first direction. The navigable dimensions may also be restricted to one dimension, typically the dimension will be along the X,Z ground plane, with a constant Y co-ordinate. The positional mapping may be configured to map operator input to one or more output characteristics based on other geometry. Examples of a rail constraint include an orbital rail constraint where the mapping converts a single input representing a position on a radius of an ellipse to a co-ordinate in the world by solving the function for an ellipse. Another example of a rail constraint is a multi-dimensional orbital rail constraint where the geometry is a cylinder or hemisphere. Still another example of a rail constraint is a line rail constraint where the mapping is the function for a straight line.

A typical use for the system 100 is in the generation of video coverage of sports events such as soccer though the system 100 may conceivably be applied in many cases where virtual cameras are used to capture well composed video coverage of events involving moving and interacting players, and other paraphernalia (such as a ball). The moving and interacting players, and other paraphernalia referred to above may be collectively referred to below as subjects. Another example use of the system 100 includes the generation of video coverage of theatre, museums, community events, dance performances, and the like.

A method 300 of generating constraints will now be described with reference to FIG. 3. As described below, the constraints generated in accordance with the method 300 are presented to the virtual camera operator through a user interface that the virtual camera operator uses to control the virtual camera. The method 300 may be implemented as one or more software code modules of the software application program 233 resident in the hard disk drive 210 and being controlled in its execution by the processor 205.

The method 300 begins at identifying step 310, where current characteristics of a virtual camera are identified under execution of the processor 205. As described below, the characteristics of the virtual camera may be at least partially defined by constraints associated with an initial virtual camera rail.

The characteristics identified by the method 300 include, but are not limited to, the direction that the virtual camera is pointing (i.e., pan and tilt parameters), the zoom setting of the virtual camera, the position of the virtual camera within the performance arena 110, current velocity of the virtual camera as the virtual camera changes position over time, and any constraints currently applied to the virtual camera. The characteristics are a result of past inputs made by an operator to control the virtual camera, or may be default values assigned by the system 100. As described in detail below, the characteristics identified at step 310 are used by heuristics in a 'generate candidate constraints' step 330 and an 'evaluate and rank candidate constraints' step 340.

At state of play identifying step 320, the characteristics of the state of play for the event (or game) occurring within the performance arena 110 are identified under execution of the processor 205. The arena 110, in the example of FIG. 1, contains players from a first team (e.g. 150) and a second team (e.g. 160) and a ball 140.

The positions of the players (e.g., 150, 160) and ball (e.g., 140) are analysed to identify where to place generated candidate constraints. At step 320, successively larger orbital rail constraints are placed around the primary subject (e.g. the ball 140) and the players (e.g., 150, 160) interacting with the primary subject. Also at step 320, any formations that may be used to inform constraint generation are identified under execution of the processor 205. The identified formations consist of groups of players within relative close proximity of one another, arranged in some specific manner (e.g. a line). Line formations may indicate that a line rail constraint is more appropriate, for example, than an orbital constraint that is better suited to a less organised cluster of players. The phase of the game may also be analysed at step 320, either based on operator input or via other means such as the elapsed time, to provide additional information on the characteristics of the state of play. The characteristics of the state of play, produced in step 320, are used by heuristics in the 'generate candidate constraints' step 330 and the 'evaluate rank candidate constraints' step 340.

After identifying the current camera characteristics and the state of play characteristics, candidate constraints are generated at generating step 330 based on the state of play characteristics identified at step 320 and proximate to a current virtual camera (i.e. within rough bounds of the performance arena 110). Candidate constraints are constraints that are generated speculatively and that a camera operator may choose to apply to a virtual camera. Orbital rail constraints are generated encompassing the primary subject (e.g., ball 140) and the next closest subject (e.g., player 150), then a next orbital rail constraint is generated including the next closest subject (e.g., player 160), until all subjects are included within the region of at least one orbital rail constraint. Straight line rail constraints are then generated for each identified line formation in both the parallel and perpendicular directions. The straight line rail constraints are generated a distance away from the centroid of the region using a heuristic that seeks to ensure all objects within the region are within the frame, given the current field of view of the virtual camera. The radius of the orbital constraints is governed by a similar heuristic. To facilitate navigation from a current position of the virtual camera to a position on the generated constraint, a transition path constraint is generated for each generated constraint. The transition path constraint is generated such that the transition path is of smoothly varying curvature and connects the current position of the virtual camera to a position on the candidate rail constraint. As described below, a score may be determined for a transition path based on smoothness of the transition. A method 400 of generating orbital rail constraints, line rail constraints, and transition path constraints, as executed at step 330, will be described in detail below with reference to FIG. 4.

The set of candidate constraints generated at step 330 is evaluated at evaluating step 340 to determine which constraint or constraints will be offered to the operator at presenting step 350. Each constraint is evaluated at step 340 using a number of heuristics to determine an overall suitability for presenting a best possible view of the state of play. The heuristics include, but are not limited to, the quality of the transition path constraint generated at step 330 where the heuristic seeks a path such that any curve is not overly tight relative to a current velocity of the virtual camera; a distance of the constraint from the primary object (e.g., the ball 140) relative to the velocity of the current virtual camera, where the heuristic seeks a greater distance for a faster moving virtual camera; the phase of the game, where the heuristic seeks to focus on the important area of the arena 110 depending on the current phase of the game. The heuristics combined, produce an overall score that allows sorting of the generated candidate constraints, to produce a list where the first entry is the candidate constraint that is deemed suited to the current virtual camera characteristics and the characteristics of the state of play. A method 800 of evaluating candidate constraints, as executed at step 340, will be described in detail below with reference to FIG. 8.

At presenting step 350, one or more of the highest ranked candidate constraints generated at step 330 are presented to the virtual camera operator through the user interface that the virtual camera operator is using to control the virtual camera. The operator may select to apply the candidate constraint to the virtual camera, or maintain any current constraints or freeform movement instead.

As the characteristics of the state of play, and the characteristics of the current virtual camera change over time, the set of candidate constraints are regenerated and may vary from frame to frame.

The system 100 executing the method 300 uses the characteristics of the virtual camera and the characteristics of the state of play and the change thereof, to generate a constraint. The generated constraint may be used for configuring the system 100 in response to detecting a change in a state of play in a scene. When applied to a virtual camera the generated constraint provides the virtual camera operator with a constrained viewpoint for simplified navigation that aids in capturing broadcast quality video of the event occurring with the performance arena 110.

Each of the steps of the method 300 of FIG. 3 are now described in detail below.

As described above, at step 310, the current camera characteristics are identified. The identified characteristics are used at steps 330 and step 340 to inform the generation and ranking processes. The identified characteristics may either be copied to an accessible location in memory 206, or a reference to the characteristics may be determined so that the methods 400 (see FIG. 4), 500 (see FIG. 5), 600 (see FIG. 6), 700 (see FIG. 7), and 800 (see FIG. 8) may access the characteristics as required. Referring to FIG. 9, a current virtual camera 920 is a virtual camera being controlled by the operator. The current virtual camera 920 may be navigated in a constrained manner, perhaps using an orbital rail constraint 910, or may be subject to free-form navigation. In the case of free-form navigation, the operator has direct control over the camera characteristics. When a constraint is applied, the control for some characteristics will be simplified due to the constraint. For example, a constraint may simplify control on the X 923 and Z axis 922 of space 900 in which the event is occurring by mapping control of position on both those axis to a single forwards/backwards input. The co-ordinates of the virtual camera 920 on the X 923, Y 921, and Z axis 922 are the position characteristics of the virtual camera 920. The change in the position characteristics over time is the velocity characteristic. The horizontal angle of the viewing frustum characteristic is the angle of viewing frustum 924. The constraint characteristic of the virtual camera 920 is the constraint, such as the orbital rail constraint 910, that the operator has chosen to apply to the virtual camera 920. A constraint characteristic is also associated with a directionality characteristic that limits the range of motion of the virtual camera 920 on the constraint in order to preserve the meaning of directions. For example, a rail constraint may allow a virtual camera 920 to move left and right and to pan.

The pan may be limited so that the virtual camera 920 cannot pan so far that a left input moves the virtual camera 920 to the right. For example, for a line rail constraint, the virtual camera 920 will capture either the arena 110 to one side of the rail, and for an orbital rail constraint, the virtual camera 920 will capture the area either within the orbital rail or outside of the orbital rail, but not both.

As described above, at step 320, the characteristics of the state of play for the event (or game) occurring within the arena 110 are identified. The characteristics identified at step 320 are used at steps 330 and step 340 to inform the generation and ranking processes. The identified characteristics may either be copied to an accessible location in memory 206, or a reference to the characteristics identified at step 320 may be determined so that the methods 400, 500, 600, 700 and 800 may access characteristics identified at step 320 as required.

Referring to FIG. 1, at step 320, the boundary 130 of the arena 110 is identified. Next the set of subjects (e.g., ball 140, player 150, player 160) is identified. The characteristics of the subjects are updated continuously at video frame rates. The subject characteristics may be constructed and maintained using a number of different technologies. In one arrangement, radio tracking and arena specifications are combined to construct a model of the playing arena 110 from a projective top view perspective. Video data may also be used for constructing the model, especially where a camera is placed directly above the playing field. The use of radio tracking has the advantage however of reducing player identification and tracking ambiguities when compared to video analysis alone.

The set of subjects for a soccer game includes the players 150, 160, etc. from both teams and the ball 140. The primary subject is configured by an operator to be the subject of most importance and is usually fixed throughout the game, though may be configured by an operator to be any tracked subject.

In the game of soccer depicted in FIG. 1 the primary subject is the ball 140. In events such as a theatrical performance that do not have a fixed primary subject, the primary subject may be updated regularly by the operator to be the main character for a scene or other interval. At step 320, formations of players that may be used to inform constraint generation are determined. Clusters of players are analysed to determine whether the players are roughly laid out in a 'line formation'. Clusters are identified as a group of players within close proximity of one another. In the soccer game of FIG. 1, clusters are identified as three or more players within 20 m of one another, plus any other player within 20 m of the first three identified players. Alternate configurations may be relevant in different events, and depending on broadcaster requirements.

Figure 11:
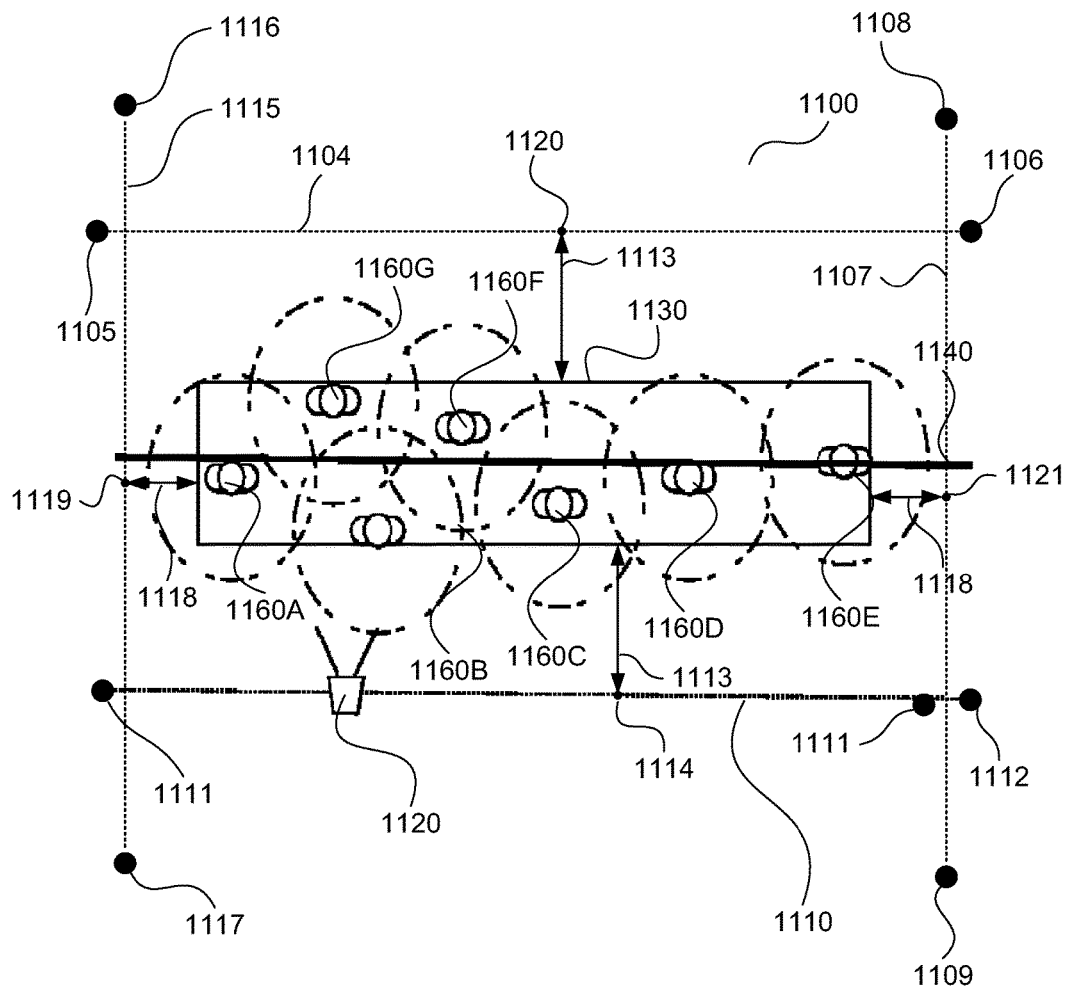
FIG. 11 is a diagram of a scene depicting a line formation and the resulting generated constraints.

A line formation may be identified by plotting a trend line for the players within the cluster. Then if 80% of the players are within a particular distance (e.g., 2 m in the soccer game of FIG. 1) of the trend line, a line formation is recorded with the geometry of the trend line. An example of a recorded trend line 1140 is shown in FIG. 11. To determine the X and Z co-ordinates of points on the trend line within the arena 110, the standard equation for a straight line is used, as follows:

$$z = mx + c \quad (1)$$

where x and z are the X and Z co-ordinates of each player, respectively, and where $$m = \frac{n\Sigma(xz) - \Sigma x \Sigma z}{n\Sigma x^2 - (\Sigma x)^2} \quad (2)$$

$$c = \frac{\Sigma y - m\Sigma x}{n} \quad (3)$$

and where $\Sigma$ refers to summation of a particular attributes of a player, e.g. x, y, z coordinates or a product of coordinates of the player, over the set of players within the cluster.

The state of the game may also include a phase of the game characteristic. The phase of the game characteristic may be used by heuristics that rank the generated candidate constraints. The phase of the game is event specific. The phase of the game may be inferred through aspects of the event such as the elapsed time, or the phase of the game may be selected by the virtual camera operator. The phase of the game for the soccer game of FIG. 1 includes options of 'before the game', 'kick off', 'corner kick', 'half-time', and 'penalty shoot-out'.

A method 400 of generating orbital rail constraints, line rail constraints, and transition path constraints, as executed at step 330, will be described in detail below with reference to FIG. 4. The method 400 may be implemented as one or more software code modules of the software application program 233 resident in the hard disk drive 210 and being controlled in its execution by the processor 205.

The method 400 begins at initialising step 405, where an empty set, R, is configured within memory 206 under execution of the processor 205. Orbital rail constraints, such as the orbital rail constraint 910, shown in FIG. 9, are generated first, at orbital rail generating step 410. A method 500 of generating orbital rail constraints, as executed at step 410, will be described in detail below with reference to FIG. 5. The orbital rail constraints are stored in the set R configured within the memory 206.

The method 400 continues at line rail constraint generating step 420, where line rail constraints are generated. As shown in FIG. 11, line rail constraints 1110 are dependent on identification of line formations 1140 during step 320 of the method 300. For each line formation identified during step 320, four line rail constraints are generated at step 420, two parallel 1110 to the line formation 1140, and two perpendicular 1115 to the line formation 1140. A method 600 of generating line rail constraints, as executed at step 420, will be described in detail below with reference to FIG. 6. The generated line rail constraints are stored in the set R configured within the memory 206.

Figure 13:
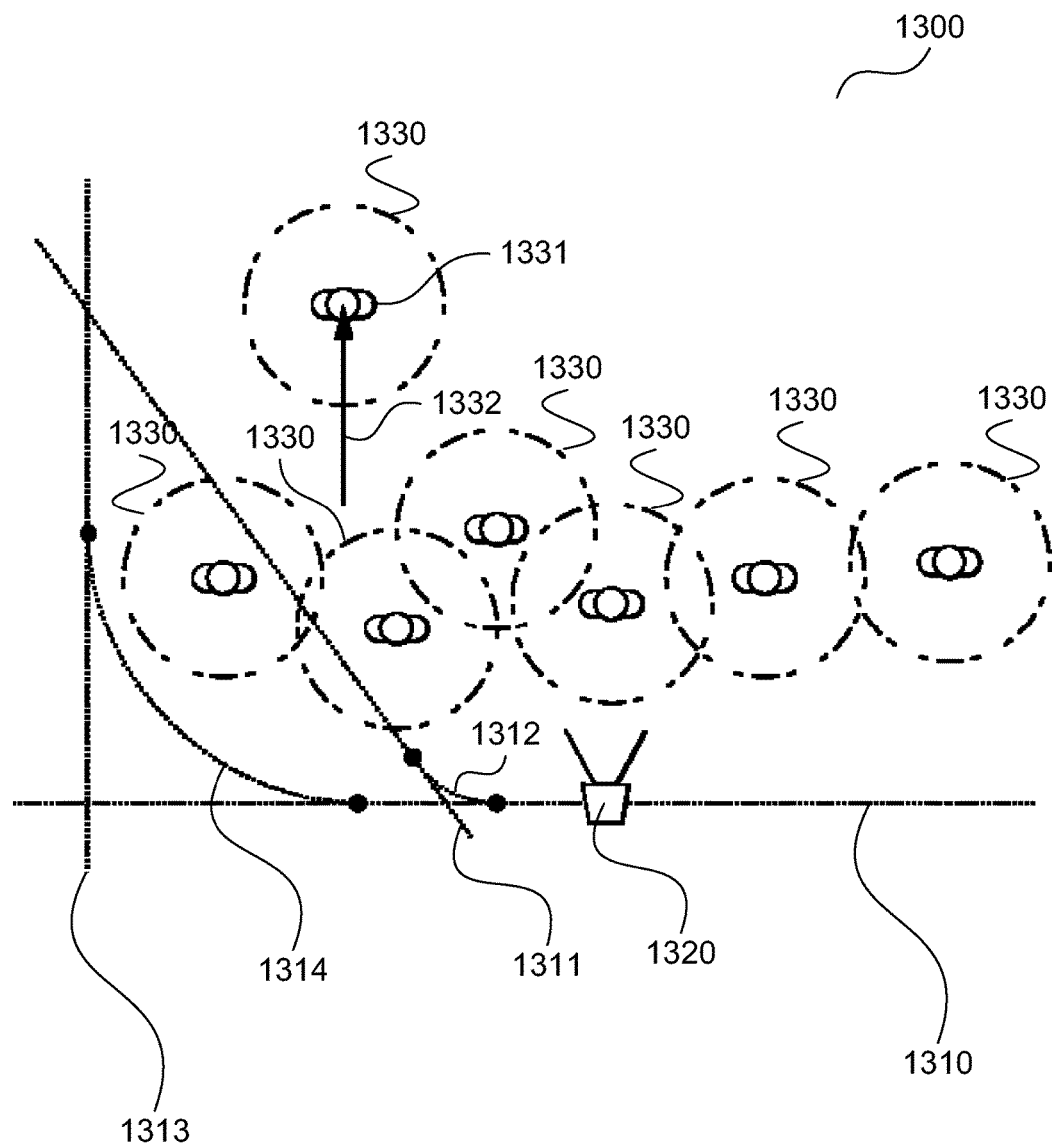
FIG. 13 is a diagram of a scene change in the state of play, and the resulting generated rail constraints.

Then at transition path generating step 430, transition path constraints are generated for each rail constraint stored in the Set R. Referring to FIG. 13, virtual camera 1320 is constrained on a line rail constraint 1310. A first candidate constraint 1311 and a second candidate constraint 1313 have been identified as a result of the state of play changing. Subject 1331 has departed the horizontal line formation consisting of subjects 1330 and is travelling away in the direction of arrow 1332. The first transition path constraint 1312 defines a path that the virtual camera 1320 may follow to provide a smooth transition onto the first candidate constraint 1311. The second transition path constraint 1314 defines a path that the virtual camera 1320 may follow to provide a smooth transition onto the second candidate constraint 1313. Thus, a transition path constraint is a specialised type of constraint that facilitates a transition of a virtual camera from a first constraint onto a second constraint. A transition path constraint is stored as a sub-constraint of the candidate constraints. Each candidate constraint will have one sub-constraint that is a transition path constraint. A method 700 of generating transition path constraints, as executed at step 430, will be described in detail below with reference to FIG. 7.

The method 500 of generating orbital rail constraints, as executed at step 410, will be described in detail below with reference to FIG. 5. The method 500 will be described by way of example with reference to FIG. 12 which shows subjects 1210 and 1221 participating in a game of soccer with another subject 1210 in the form of a ball. The method 500 may be implemented as one or more software code modules of the software application program 233 resident in the hard disk drive 210 and being controlled in its execution by the processor 205.

The method 500 begins at initialising step 505, where an empty Set S is initialised within memory 206 under execution of the processor 205. Continuing at identifying step 510, a primary subject is identified from the set of subjects identified at step 320 of the method 300. For example, referring to FIG. 12, primary subject 1210 may be identified. The primary subject is added to the Set S configured within memory 206. Processing continues at identifying step 520, where a closest subject 1220 to the primary subject 1210 is also added to the Set S configured within the memory 206. Next, at determining step 530, a two dimensional (2 d) bounding circle 1260 that encompasses the subjects in Set S is determined. The bounding circle 1260 is determined with respect to ground plane (X,Z axis).

The 2 d bounding circle 1260 is centered on centroid 1261 of all subjects in the set S. The centroid is determined using Equation (4), as follows, where s is the X,Z co-ordinate of each subject in the Set S, and k is the number of subjects in the Set S.

$$C = \frac{s_1 + s_2 + \ldots + s_k}{k} \tag{4}$$

Figure 12:
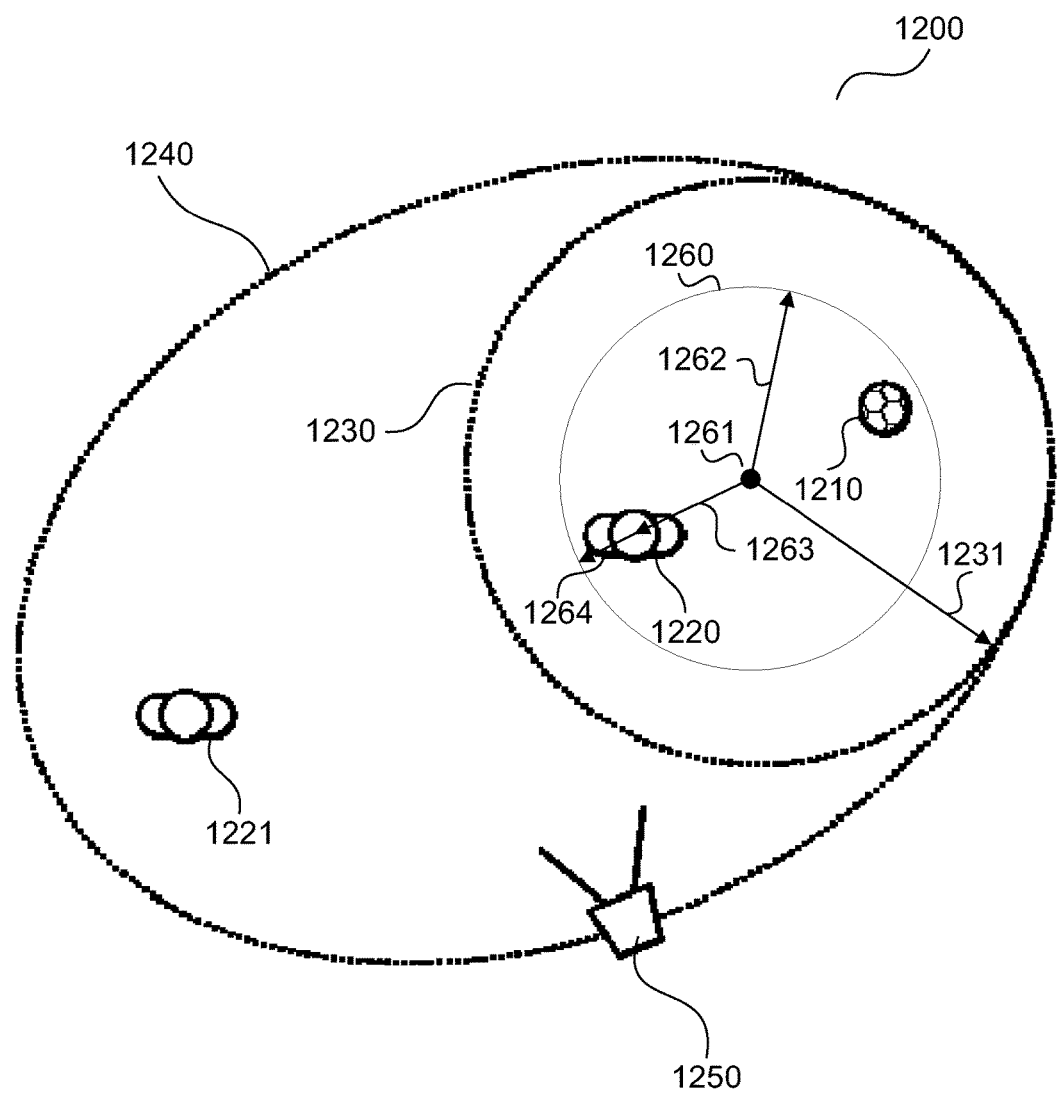
FIG. 12 is a diagram of a scene comprising subjects in a game of soccer.

Then, a radius 1262 for the bounding circle is determined. The radius 1262 is determined as the distance 1263 from the centroid 1261 to the subject 1220 that is most distant from the centroid 1261. Two subjects will always be equidistant, so either may be selected. A padding value 1264 is added. In the example of FIG. 12, a value in the region of 50% of the determined distance 1263 is used as the padding value 1264.

The method 500 continues at generating step 540, where orbital rail constraint 1230 is generated under execution of the processor 205. Each orbital rail constraint has radius and X,Z position characteristics. The values for the X,Z position characteristics of the orbital rail constraint are the X,Z co-ordinates of the centre 1261 of bounding circle 1260. The value for the radius characteristic (r) is determined using Equation (5), as follows, which aims to ensure that the subjects reasonably fill the frame, given the horizontal angle of the viewing frustum characteristic of the current virtual camera.

$$r_o = \frac{r_b}{\tan\left(\frac{1}{2}\alpha\right)} \tag{5}$$

Referring to FIG. 12, $r_o$ is the resulting radius 1231 of the orbital rail constraint 1230. $r_b$ is the radius 1262 of the bounding circle 1260 around the subjects 1210 and 1220 that are entirely visible from the viewpoint of a virtual camera on the orbital rail constraint. α is the horizontal angle of the viewing frustum characteristic of the current virtual camera.

Figure 15:
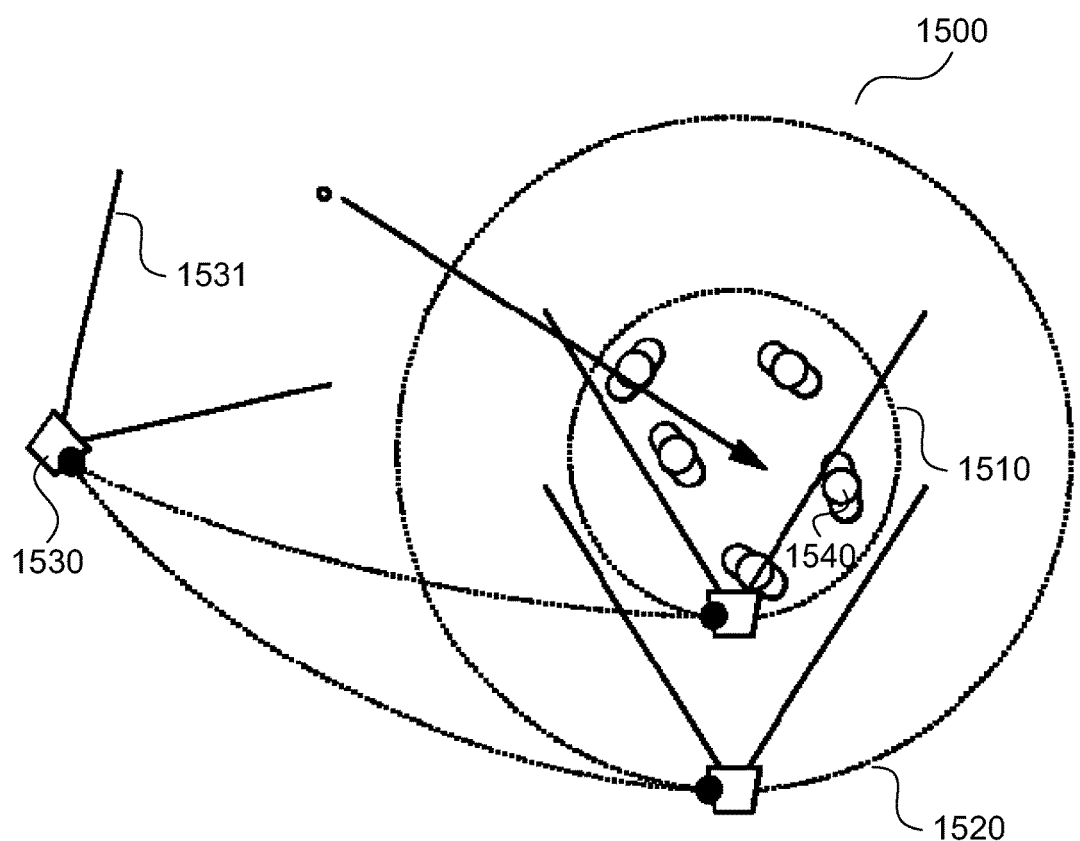
FIG. 15 is a diagram of a scene depicting a scene with two generated orbital rail constraints and demonstrating the effect of the field of view characteristic of the virtual camera.

As seen in FIG. 15, first orbital rail constraint 1510 has too small a radius to allow the virtual camera 1530 with a horizontal angle of the viewing frustum characteristic [15]31 to view all the subjects, especially one subject 1540 who is not in the frame at all. The orbital rail constraint 1520 provides a much better vantage point for capturing the subjects within the video frame than the constraint 1510, and it is determination of the orbital rail constraint with a most suitable vantage point that the step 540 aims to determine.

The generated rail 1230 is added to Set R, initialised at step 405 of method 400, which is the set of candidate rails that may be presented to the operator.

Next, at decision step 550, if there are subjects not in Set S, then the method 500 ends. Otherwise, the method 500 returns to step 520 where the next closest subject that is not in Set S is added to Set S and orbital rail generation continues. Referring again to FIG. 12, orbital rail constraint 1240 is generated in addition to orbital rail constraint 1230, and Set R includes both the generated orbital rail constraints when method 500 ends.

Figure 6:
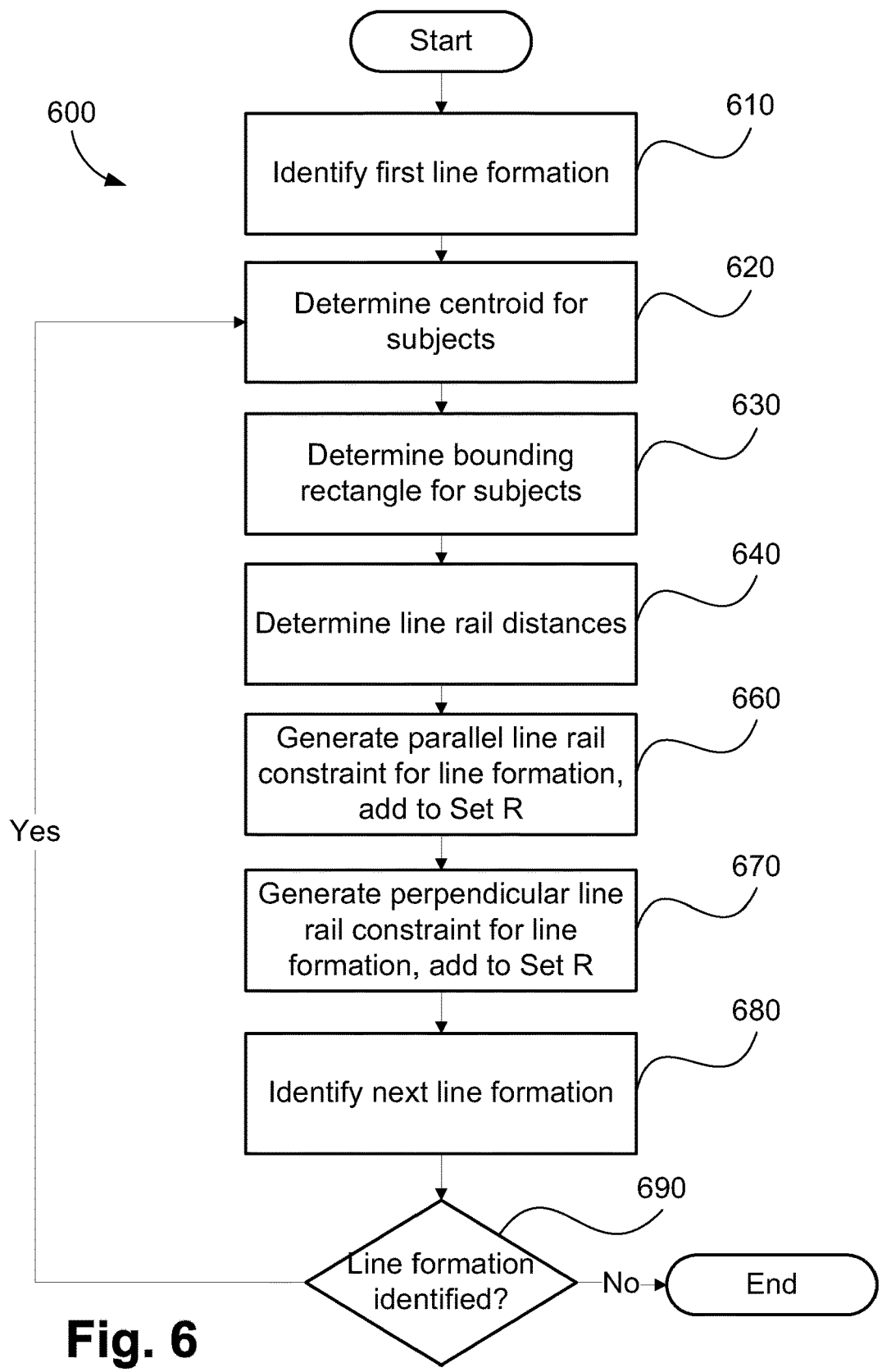
FIG. 6 is a schematic flow diagram showing a method of generating line rail constraints as used in the method of FIG. 4.

The method 600 of generating line rail constraints, as executed at step 420, will now be described with reference to FIG. 6. The method 600 may be implemented as one or more software code modules of the software application program 233 resident in the hard disk drive 210 and being controlled in its execution by the processor 205. The method 600 will be described by way of example with reference to FIG. 11.

The method 600 begins at identifying step 610, where a first line formation is identified under execution of the processor 206. Then, at determining step 620, the centroid for the subjects involved in the identified line formation is determined. The determined centroid may be stored in the memory 206.

At determining step 630, a bounding rectangle 1130 for the subjects 1160A-1160G involved in the line formation is determined under execution of the processor 205. The bounding rectangle 1130 is axis-aligned with the line formation 1140 with the width dimension parallel to the line formation and the height dimension perpendicular. Any suitable method for determining a bounding rectangle for a set of points, represented as X,Z co-ordinates, may be used at step 630 to determine the bounding rectangle 1130.

At determining step 640, a first 1113 and second 1118 distance is determined, the first distance 1113 guiding the creation of the parallel rail line rail constraints 1110 and 1104, the second distance 1118 guiding the creation of the perpendicular rail line rail constraints 1115 and 1107. The first and second distances are both determined in a similar manner to the radius of the orbital rail constraints and may be stored in the memory 206. The first and second distances are determined such that the subjects involved in the line formation will reasonably fill the frame, given the horizontal angle of the viewing frustum characteristic of the current virtual camera. In this instance, a bounding rectangle 1130, in conjunction with the horizontal angle of the viewing frustum of the current virtual camera is the basis for determining the distance at step 640. The first distance 1113 is determined using Equation (6), below, where $d_1$ is the first distance 1113, $b_w$ is the width dimension of the bounding box 1130, and $\alpha$ is the horizontal angle of the viewing frustum characteristic of the current virtual camera.

$$d_1 = \frac{b_w}{\tan\left(\frac{1}{2}\alpha\right)} \quad (6)$$

The second distance 1118 is also determined at step 640, using Equation (7), below, where $d_2$ is the second distance 1118, $b_h$ is the height dimension of the bounding box 1130, and $\alpha$ is the horizontal angle of the viewing frustum characteristic of the current virtual camera.

$$d_2 = \frac{b_h}{\tan\left(\frac{1}{2}\alpha\right)} \quad (7)$$

Given the first distance 1113, the parallel line rail constraints 1110 and 1104 are generated at generating step 660. Each parallel line rail constraint is characterised by a starting X, Z co-ordinate 1111 and 1105 and an ending X,Z co-ordinate 1112 and 1106. The co-ordinates 1105, 1106, 1111 and 1112 are determined by determining the points 1114 and 1120 that are a distance $d_1$ from the bounding box, then projecting a line outwards in both directions parallel to the line formation. The starting X,Z co-ordinates 1111 and 1105 are the points where the lines, in the first direction, intersect with the boundary of the arena 130, the ending X,Z co-ordinates 1112 and 1106 are where the lines, in the second direction, intersect with the boundary of the arena 130. The generated parallel line rail constraints 1110 and 1104 are added to Set R, initialised at step 405 of method 400, which is the set of candidate rails that may be presented to the operator.

The perpendicular line rail constraints, also characterised by a starting X,Z co-ordinate 1116 and 1108 and an ending X,Z co-ordinate 1117 and 1109 are determined using the second distance 1118 at step 670. The starting and ending co-ordinates are determined by determining the points 1119 and 1121 that are the distance $d_2$ from the bounding box 1130, then projecting lines outwards in both directions perpendicular to the line formation. The starting X,Z co-ordinates 1116 and 1108 are at the point where the line, in the first direction, intersects with a boundary 131 that lies outside of the boundary of the arena 130 and defines the limits for the line rail constraints. The ending X, Z co-ordinates 1117 and 1109 are a point where the line, in the second direction, intersect with boundary 131. The generated perpendicular line rail constraints 1115 and 1107 are added to Set R, initialised at step 405 of method 400, which is the set of candidate rails that may be presented to the operator. Then, the method 600 progresses to identifying step 680 where an attempt is made to identify a next line formation that has not been processed. If a line formation is identified, the method 600 loops to step 620 and generates line rail constraints for the identified line formation. If no more line formations require processing, then the method 600 concludes. Set R will include all generated line rail constraints following execution of the method 600.

Figure 7:
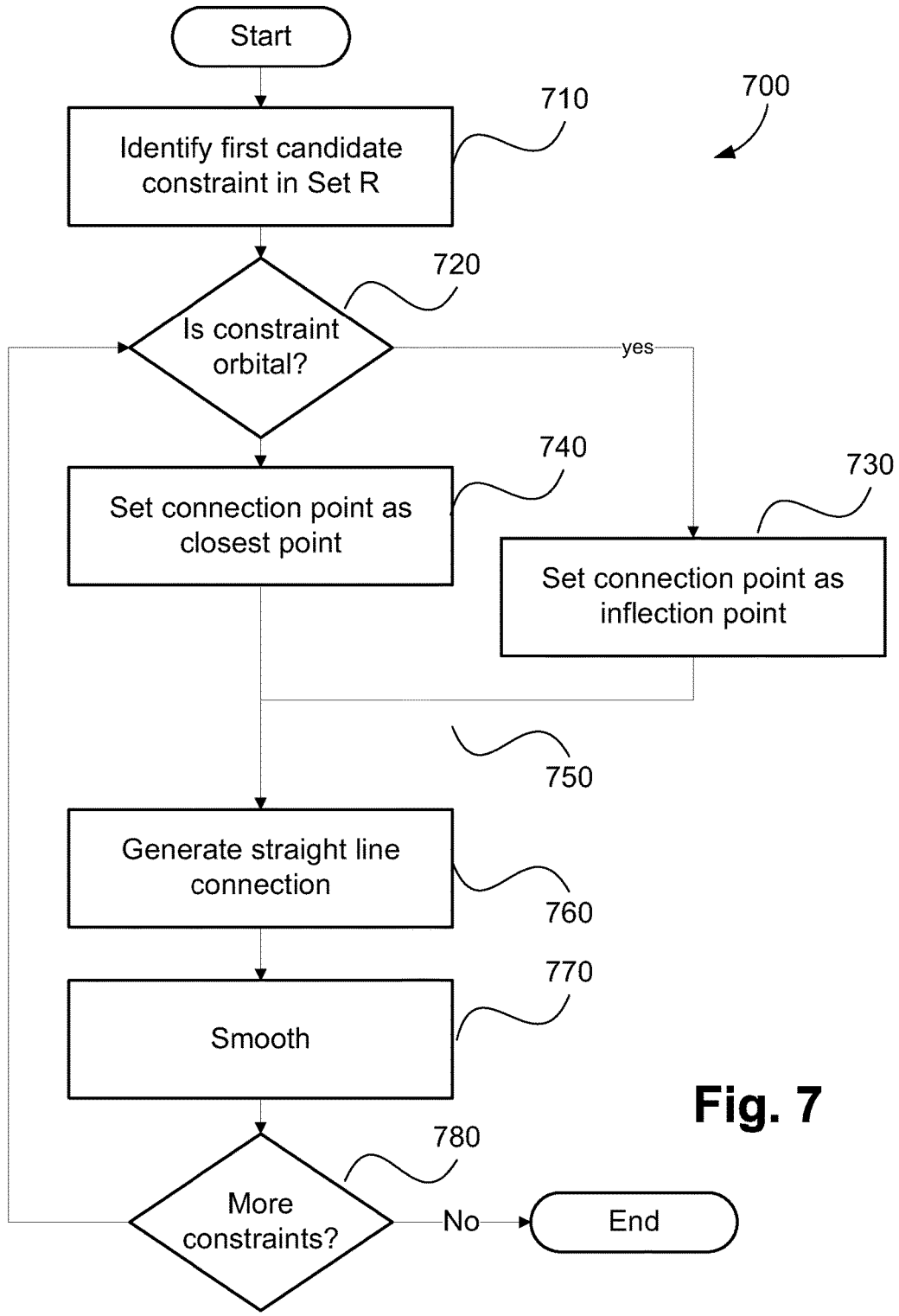
FIG. 7 is a schematic flow diagram showing a method of generating transition path constraints as used in the method of FIG. 4.

The method 700 of generating transition path constraints, as executed at step 430, will be described in detail below with reference to FIG. 7. The method 700 is used for generating transition path constraints for candidate constraints. The method 700 may be implemented as one or more software code modules of the software application program 233 resident in the hard disk drive 210 and being controlled in its execution by the processor 205. The method 700 begins at identifying step 710, where a first candidate constraint in Set R is selected for transition path constraint generation. A connection point, where the transition path constraint joins the candidate constraint is generated. The process for generating the connection point is different for an orbital rail constraint compared to a line rail constraint. Therefore, at decision step 720, if the selected candidate constraint is determined to be an orbital rail constraint, then the method 700 continues to setting step 730. Otherwise, the method 700 proceeds to setting step 740.

At step 730, the connection point is determined for an orbital rail constraint. The connection point is set as the inflection point where a tangent, originating from the current virtual camera's position, touches the orbital rail constraint. There are two possible solutions for the inflection point; the chosen solution is the solution that maintains the orientation of the directionality characteristic of the current virtual camera.

For a line rail constraint, at step 740, the connection point is set as the point on the candidate line rail constraint that is closest to the position of the current virtual camera. Then at generating step 760, a straight line from the position of the current virtual camera to the connection point. The generated straight line may be used as the geometry for the transition path constraint. However, to further improve the quality of the transition represented by the generated straight line, at smoothing step 770 an outgoing angle is considered. The outgoing angle is the angle between the current constraint (if one is applied) for the virtual camera and the transition path constraint. Also at step 770, a connection angle is considered. The connection angle is the angle between the transition path constraint and the candidate constraint. At step 770, a smoothing algorithm (e.g. smooth line segments by generating Bezier curves or with Catmull-Rom smoothing) is applied to the generated straight line to reduce the rate of change from one direction to another. Depending on the geometries of the constraints, the rate of change may still be high, even after smoothing.

Then at decision step 780, if there are more candidate constraints in Set R that do not have transition path constraints generated then the next candidate constraint is determined and the method 700 loops back to step 720.

Upon completion of the method 700, all candidate constraints are generated, and method 400 of FIG. 4 is complete. Referring now to the method 300 of FIG. 3, the next step in processing is to rank the candidate constraints at step 340.

A method 800 of evaluating candidate constraints, as executed at step 340, will be described in detail below with reference to FIG. 8. The method 800 may be implemented as one or more software code modules of the software application program 233 resident in the hard disk drive 210 and being controlled in its execution by the processor 205.

Figure 8:
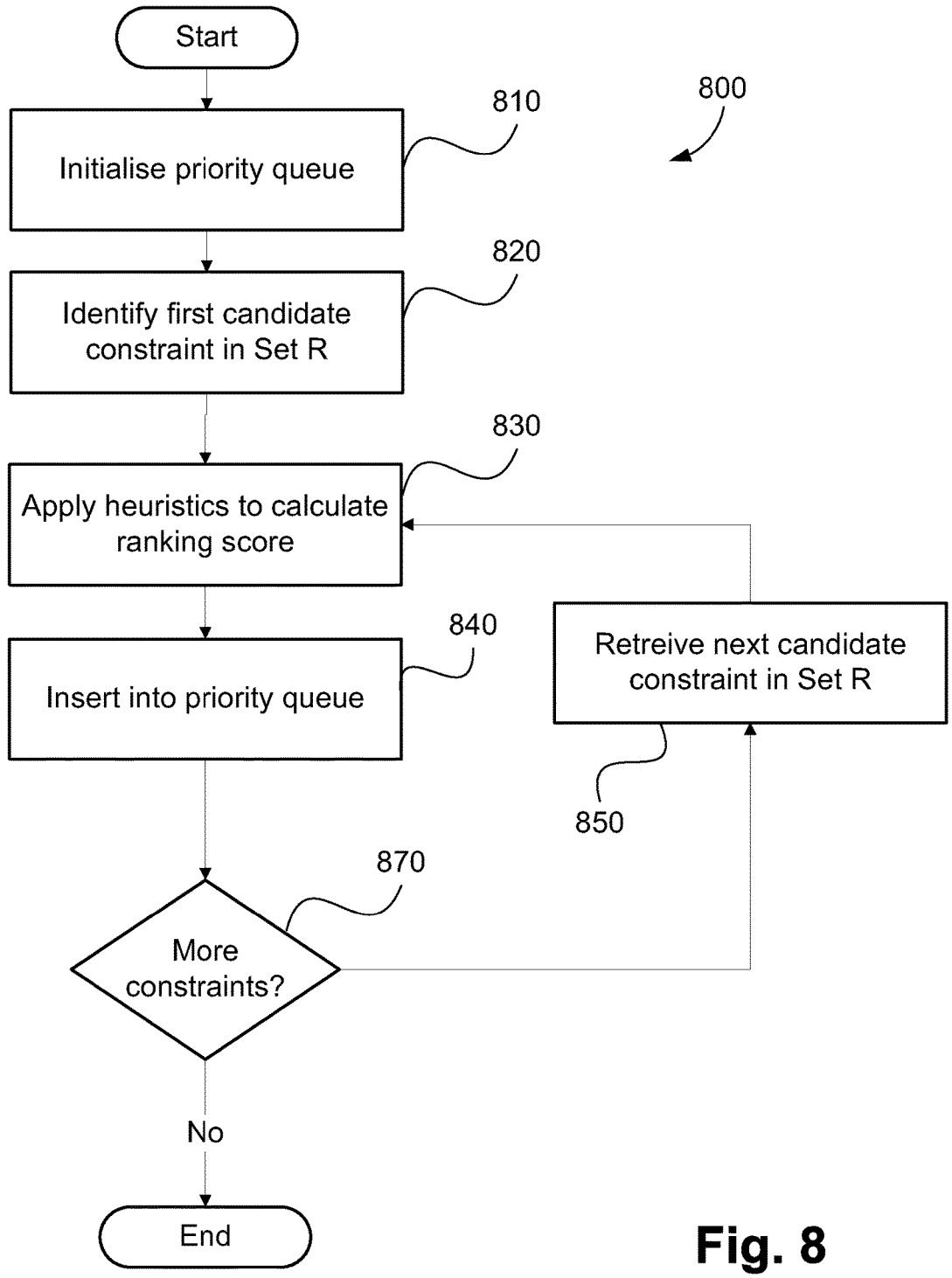
FIG. 8 is a schematic flow diagram showing a method of evaluating and ranking generated constraints as used in the method of FIG. 3.
Figure 9:
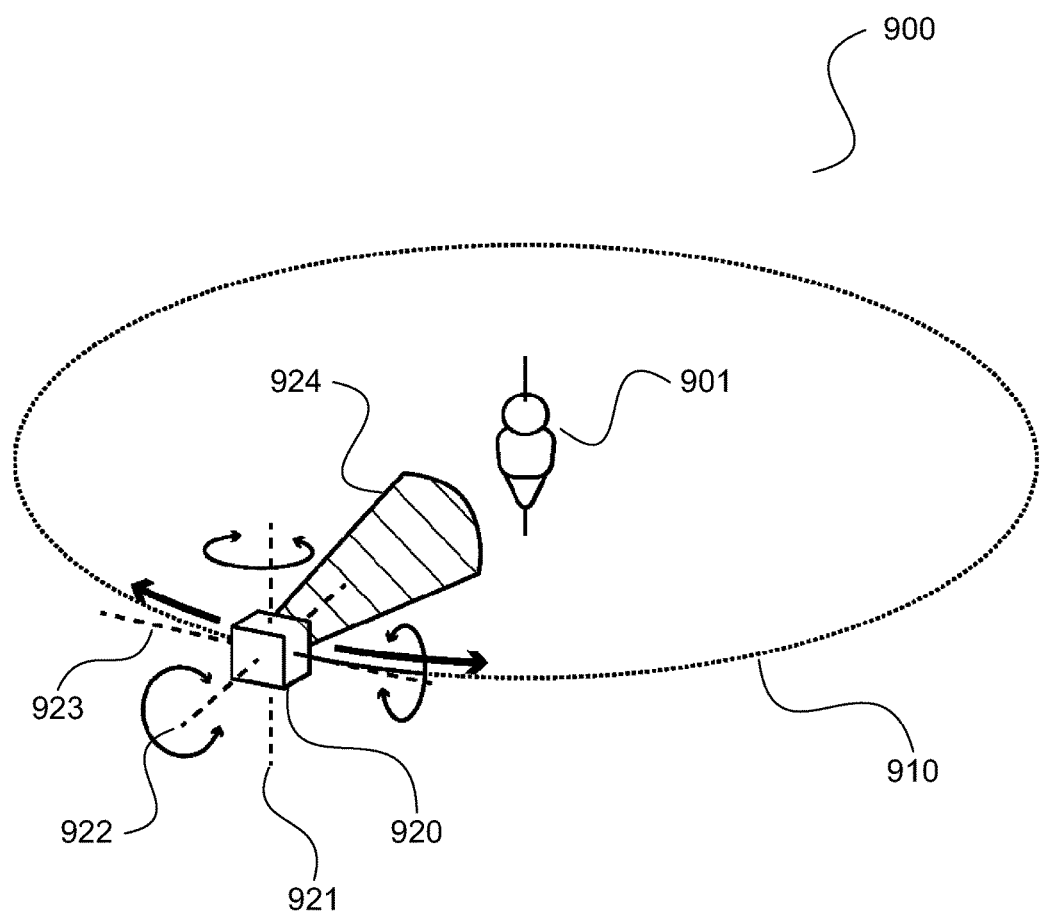
FIG. 9 is a diagram of a scene containing a virtual camera and characteristics of the virtual camera.

Referring to FIG. 8, beginning at initialising step 810, a priority queue is initialised within the memory 206 under execution of the processor 205. The priority queue will be used to store the candidate constraints in ranked order. Thus, once the method 800 is complete, the first candidate constraint in the priority queue will be the highest ranked candidate constraint, which the system 100 has determined is best able to provide a viewpoint for capturing the events occurring in the arena 110.

Then at retrieving step 820, the first candidate constraint from the Set R is retrieved under execution of the processor 205. At applying step 830, each heuristic is applied to the candidate constraint, where each heuristic gives a ranking score in the range of zero to one. An overall ranking score is determined at step 830 by averaging the individual ranking scores. In an alternative arrangement, the overall ranking score may be a weighted average if differing importance is to be given to the heuristics. The ranking score is used at inserting step 840 to insert the candidate constraint retrieved at step 820 into the priority queue. The priority queue applies ordering based on the given ranking score, with the highest score being a first node in the priority queue. The ranking scores used in accordance with the described methods will be described in further detail below.

Then at decision step 870, if there are more candidate constraints to rank, then the method 800 proceeds to retrieving step 850. At step 850, the next candidate constraint is retrieved from Set R and processing continues to step 830 where the candidate constraint is ranked and subsequently inserted into the priority queue. Once it is determined that there are no more candidate constraints to be ranked at step 870, the method 800 concludes.

A selection of heuristics is used in the described methods to determine the ranking score as will now be described in further detail. The heuristics are not limiting and various other heuristics may be applied in alternative implementations of the described methods.

In broadcast video of sports events, when a camera view depicts the arena from a side-on (or mostly side-on) view, then a left/right convention is often maintained. The left/right convention dictates that the direction to the left of framing and the direction to the right of the framing are constant. This ensures viewers can understand the state of play with respect to the physical space in which an event is occurring.

When ranking candidate constraints, a low rank is given to any constraint that would break the left/right convention. The ranking score is determined using the angle between a vector that describes the left convention for the arena 110 and a vector pointing left along the candidate constraint. The smallest angle between the two vectors ($\theta a$) is determined. The value of $\theta a$ is then copied into $\theta b$ configured, for example, in memory 206. If $\theta a$ is over 90 degrees, then $\theta a$ is re-determined as 180−$\theta a$. If $\theta a$ is less than a predetermined threshold (e.g., 45 degrees in one arrangement) then the candidate constraint is considered to be oriented such that the left/right convention is maintained. If the candidate constraint is not considered to be oriented such that the left/right convention is maintained, then the left/right convention heuristic is not used when determining a ranking score. When the candidate constraint is considered to be oriented such that the left/right convention is maintained, then $\theta a$ is used as the basis for determining a ranking score. If $\theta b>90$ then a ranking score of one (1) is given, otherwise a ranking score of zero (0) is given.

A high quality transition is a transition that allows a virtual camera to transition smoothly from a first constraint to a second constraint. The appearance of transitioning smoothly is greatly affected by sudden sharp turns in the motion path of the virtual camera. A high quality heuristic considers a speed characteristic of the current virtual camera relative to the time taken to change direction when travelling along a transition path constraint.

The rate of change for a path segment may be determined by comparing the direction at the start of the transition path constraint to the direction at the end of the transition path constraint. The difference is the change in direction. Equation (8), below, is used to determine the rate of change (RoC) (degrees/second), with inputs theta representing difference in change of direction, V representing velocity of the current virtual camera, and d being length of the transition path constraint.

$$RoC = \frac{\theta |V|}{d} \quad (8)$$

Using the determined rate of change, a score may be determined using Equation (9), below:

$$\text{score} = \frac{RoC_t}{RoC} \quad (9)$$

$RoC_t$ represents the threshold rate of change, the value of which is not exceeded in one arrangement. The score determined in accordance with Equation (9) is clamped in the range 0 . . . 1, with a higher value indicating a more preferable rate of change. In one arrangement, ten (10) degrees/second is the chosen threshold. However, other values for the threshold may be equally applicable depending on context.

Only applying to orbital rail constraints, for a primary or other subject that is moving quickly, an orbital rail constraint with a large radius is likely to provide better framing opportunities. Therefore, a heuristic that utilises velocity V of the primary subject, or optionally another subject may be applied. Such a heuristic, as defined by Equation (10) below, favours larger radii when the velocity V of the subject is high.

$$\text{score} = \frac{r}{C|V|} \quad (10)$$

where C is a constant that may be used to tune the function. In one arrangement, C=2. The value for score in Equation (10) is clamped to the range 0 . . . 1.

In an alternative arrangement, velocity may be substituted for acceleration if acceleration is not zero. Thus, a high acceleration corresponds to a larger radii as that large acceleration will result in a larger velocity in the future.

For a subject whose path of travel can be predicted (i.e. a ball in flight), a heuristic that favours rails that run in parallel to the distance of travel may be applied. A heuristic that favours rails that run in parallel to the distance of travel uses the absolute value of the dot product of the normalised velocity vector V and a normalised vector in a direction parallel to the line rail constraint, as shown in Equation (11), as follows:

$$\text{score}=|R \cdot \hat{V}|$$

Figure 14:
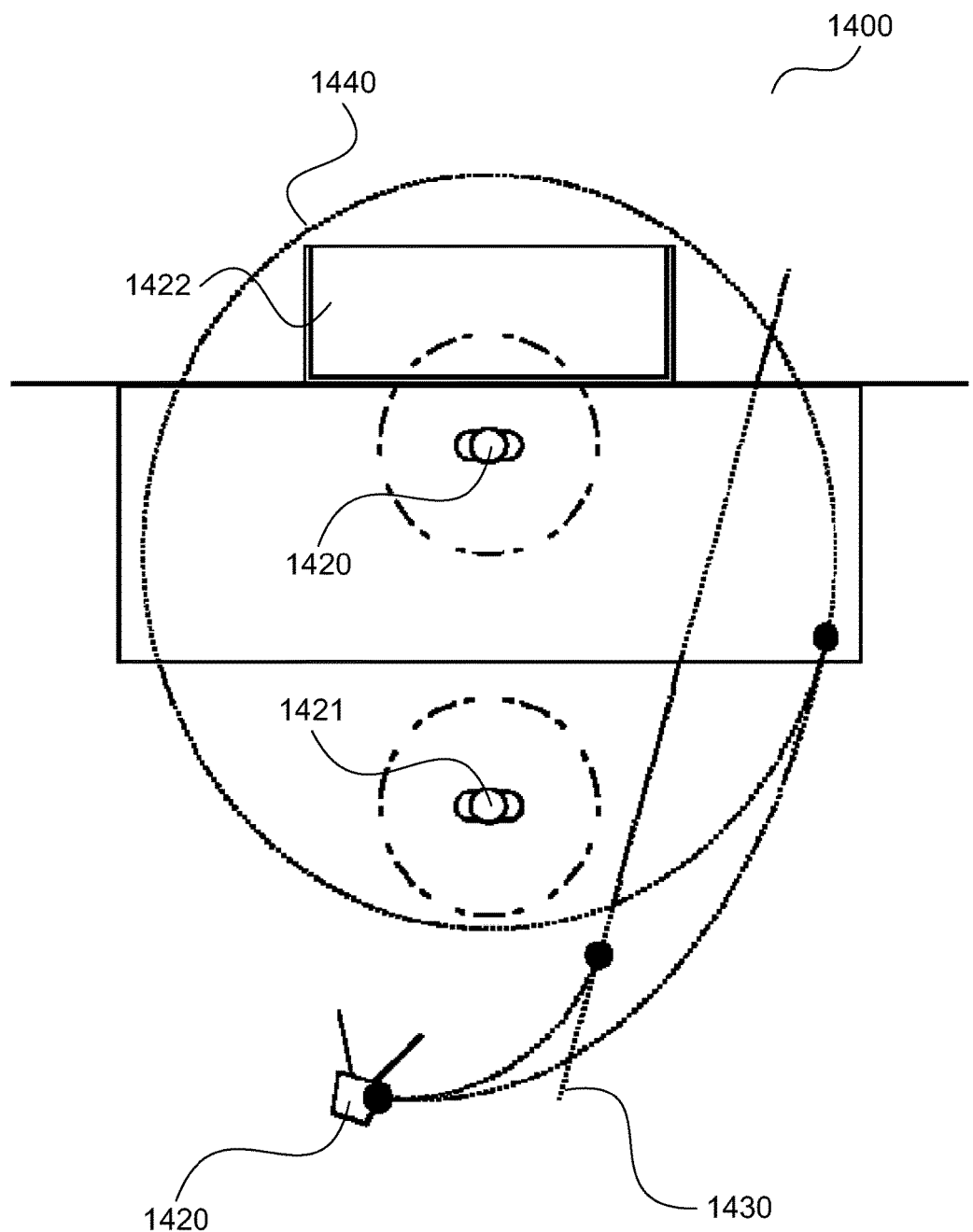
FIG. 14 is a diagram of a scene depicting a specific phase of the game, and the generated rail constraints being evaluated.

Depending on the phase of the game, events of interest may be expected to occur within a specific or limited portion of the arena 110. Therefore, a heuristic that favours constraints within those specific areas of the arena 110 is important. Example phases may be, but are not limited to, 'before the game', 'kick off', 'corner kick', 'half-time', and others. FIG. 14 is an example of the configuration of subjects within an area during a 'penalty shoot-out' phase of a soccer game. During the penalty shoot-out phase, a first subject 1421 attempts to kick the ball past a second subject 1420 and into a goal 1422. The events of interest are confined to the area immediately in front of the goal 1422, that is within the area of the orbital rail constraint 1440 and proximate to the line rail constraint 1430. Current virtual camera 1420 has the option to transition onto either the orbital rail constraint 1440 or the line rail constraint 1430. Both of the constraints 1430 and 1440 are well placed to capture the events occurring during the 'penalty shoot-out'. The phase of the game heuristic makes use of look up tables (LUTs) to determine a score for each candidate constraint. The LUT contains an entry for each phase of the game that is important, with that entry referencing one or more rectangular regions within the arena 110. During the step 830, when applying heuristics to a candidate constraint, if the current phase of the game is determined to be present in the LUT, then the candidate constraint geometry is compared to the rectangular regions stored within the LUT entry for the current phase of the game to determine the percentage of the constraint that is within the rectangular region. The percentage of the constraint that is within the rectangular region may be determined by determining the ratio of the area of the intersection of the rectangular bounding box of the candidate constraint geometry and the rectangular region retrieved from the LUT to the area of the union of the same two rectangles. A score for a phase of game heuristic may be determined based on percentage p: in accordance with Equation (12), as follows:

$$\text{score} = \frac{p}{100} \quad (12)$$

It may be desirable, in an alternate arrangement to treat line rail constraints differently than orbital rail constraints, with percentage values beyond some threshold (such as 50%) treated as 100%.

Referring again to FIG. 3, upon completion of the evaluate and rank candidate constraints step 340, the top ranked candidate constraints are presented to the virtual camera operator for selection at step 350. In one arrangement, three constraints are displayed by default. However, depending on user preferences fewer or more constraints may be shown. For example, the user may select up-front that the user would like to see only the top recommendation. Furthermore, in other arrangements the number of constraints presented to the virtual camera operator may be experimentally determined.

Figure 10:
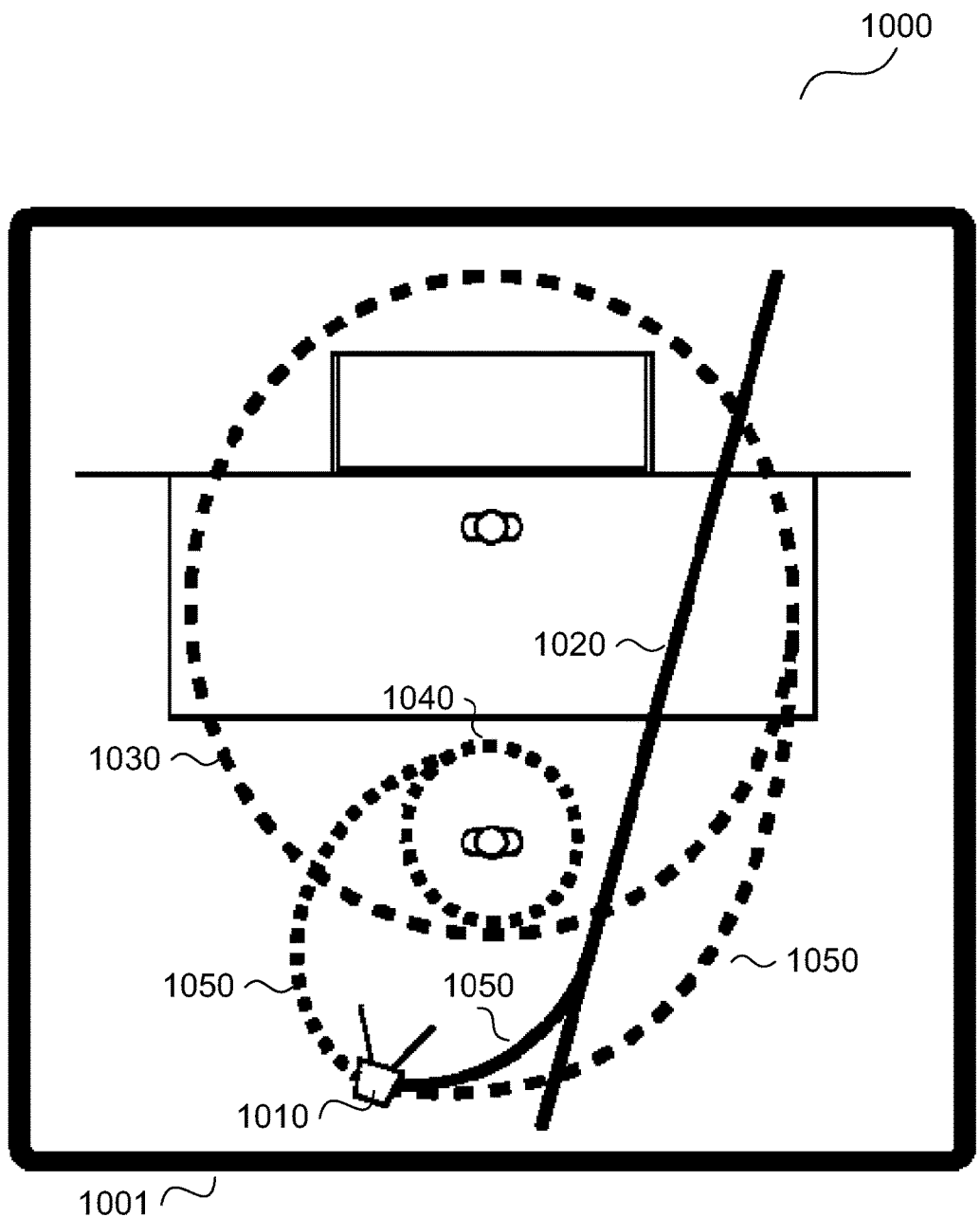
FIG. 10 is a schematic diagram of a user interface presented to a virtual camera operator.

FIG. 10 is an example of a user interface (UI) 1000 for presenting candidate constraints, displayed on a video monitor 1001, is depicted in FIG. 10. The operator is presented with a view showing pose of the current virtual camera 1010. The current virtual camera does not have any constraint characteristics currently. However, three candidate constraints have been identified and are presented to the operator. The candidate constraints are the top three ranked candidate constraints taken from the priority queue. The relative ranking of the candidate constraints is presented through the dashing of lines, with longer dash segments indicating a higher ranking. Thus, the line rail candidate constraint 1020 is the highest ranked candidate constraint, the larger orbital rail candidate constraint 1030 is the second ranked candidate constraint, and the smaller orbital rail candidate constraint 1040 is the third ranked. Transition path constraints 1050 are shown to the operator displayed alongside the candidate constraints to which the transition path constraints transition. The UI 1000 may be used for displaying a rail in response to a change in a scene. The UI 1000 may be displayed on a touch enabled screen (e.g., 214) that allows the operator to select a candidate constraint to apply to the current virtual camera through a touch gesture, where the operator touches the candidate constraint to apply. The operator may also ignore suggested candidate constraints, and keep either the current constraint characteristic, or no constraint. In an alternative arrangement, only the highest ranked candidate constraint is presented to the operator which reduces the workload of the operator in a highly dynamic environment.

The system 100 and methods described above have direct application to the generation of broadcast quality video coverage of sporting events as described. However, the system 100 and described methods have broader application to any event for which computational video coverage is possible due to the described methods being performed in a convex space that can be surrounded by synchronised cameras. In each case, different heuristics may be required to determine areas of interest and assess quality of a composed frame. However, the broad general concept of grouping subjects and ensuring an orderly motion of action across a field of view of a synthesised camera position remain.

The arrangements described are applicable to the computer and data processing industries and particularly for the image processing.

The foregoing describes only some embodiments of the present invention, and modifications and/or changes can be made thereto without departing from the scope and spirit of the invention, the embodiments being illustrative and not restrictive.

The invention claimed is:

1. A method of controlling a virtual camera for a free viewpoint image generated based on images of an area captured from different directions by a plurality of cameras, the method comprising:
   receiving user input for moving the virtual camera;
   controlling the virtual camera based on the received user input and a first virtual rail such that movement of the virtual camera by the user input is restricted to a direction along the first virtual rail;
   determining a further virtual rail based on a current position of the virtual camera on the first virtual rail and a position of an object within the area subject to image capturing by the plurality of cameras; and applying the further virtual rail to control the virtual camera such that the movement of the virtual camera by user input is restricted to a direction along the further virtual rail.

2. The method according to claim 1, wherein the current position is on the first virtual camera rail.

3. The method according to claim 1, wherein the current position is associated with a virtual camera pose.

4. The method according to claim 1, wherein the current movement of the virtual camera is at least partially defined by movement constraints associated with a virtual rail.

5. The method according to claim 1, wherein the movement of the virtual camera comprises a direction of travel and acceleration.

6. The method according to claim 1, wherein controlling the virtual camera is performed in response to detecting a change in a state of play in a scene of the area.

7. The method according to claim 1, further comprising:
generating a plurality of virtual rails each being respectively associated with a plurality of constraints of the virtual camera; and
selecting one of the generated plurality of virtual rails to be applied to control the virtual camera.

8. The method according to claim 1, wherein the further virtual rail is generated based on a viewing frustum associated with the current position of the virtual camera.

9. The method according to claim 1, further comprising displaying the generated further virtual rail on a display.

10. The method according to claim 1, further comprising displaying a plurality of virtual rails on a display, wherein in the determining, the further virtual rail is determined based on a user operation for selecting at least one of the plurality of virtual rails.

11. The method according to claim 1, further comprising:
moving the virtual camera continuously from a position on the virtual rail to a position on the determined other virtual rail.

12. An apparatus for controlling a virtual camera for a free viewpoint image generated based on images of an area captured from different directions by a plurality of cameras, the apparatus comprising:
means for receiving user input for moving the virtual camera;
means for controlling the virtual camera based on the received user input and a first virtual rail such that movement of the virtual camera by the user input is restricted to a direction along the first virtual rail;
means for determining a further virtual rail based on a current position of the virtual camera on the first virtual rail and a position of an object within the area subject to image capturing by the plurality of cameras; and
means for applying the further virtual rail to control the virtual camera such that the movement of the virtual camera by user input is restricted to a direction along the further virtual rail.

13. A system of controlling a virtual camera for a free viewpoint image generated based on images of an area captured from different directions by a plurality of cameras, the system comprising:
a memory for storing data and a computer program;
a processor coupled to the memory for executing the computer program, the computer program having instructions for:
receiving user input for moving the virtual camera;
controlling the virtual camera based on the received user input and a first virtual rail such that movement of the virtual camera by the user input is restricted to a direction along the first virtual rail;
determining a further virtual rail based on a current position of the virtual camera on the first virtual rail and a position of an object within the area subject to image capturing by the plurality of cameras; and
applying the further virtual rail to control the virtual camera such that the movement of the virtual camera by user input is restricted to a direction along the further virtual rail.

14. A non-transitory computer readable medium having a program stored on the medium for controlling a virtual camera for a free viewpoint image generated based on images of an area captured from different directions by a plurality of camera, the program comprising:
code for receiving user input for moving the virtual camera;
code for controlling the virtual camera based on the received user input and a first virtual rail such that movement of the virtual camera by the user input is restricted to a direction along the first virtual rail;
code for determining a further virtual rail based on a current position of the virtual camera on the first virtual rail and a position of an object within the area subject to image capturing by the plurality of cameras; and
code for applying the further virtual rail to control the virtual camera such that the movement of the virtual camera by user input is restricted to a direction along the further virtual rail.

15. An apparatus configured to control a virtual camera for a free viewpoint image generated based on images of an area captured from different directions by a plurality of cameras, the apparatus comprising:
a display device adapted to display a virtual rail determined based on a position of an object within the area subject to image capturing by the plurality of cameras, the virtual rail being associated with a rail constraint that restricts movement of the virtual camera by user input to movement between positions on the virtual rail;
an input device configured to receive user input for moving the virtual camera; and
a processor coupled with the input device and the display device, the processor being configured to control the virtual camera based on the user input received by the input apparatus and the rail constraint.

16. A method of controlling a virtual camera for a free viewpoint image generated based on images of an area captured from different directions by a plurality of camera, the method comprising:
controlling the virtual camera based on user input for moving the virtual camera and a rail constraint that restricts movement of the virtual camera by user input to movement between positions on a virtual rail; and
displaying another virtual rail in response to a change in position of an object within the area subject to image capturing by the plurality of cameras, the other virtual rail being associated with another rail constraint that restricts movement of the virtual camera by user input to movement between positions on the other virtual rail.

17. An apparatus for navigating controlling a virtual camera for a free viewpoint image generated based on images of an area captured from different directions by a plurality of cameras, the apparatus comprising:
means for controlling the virtual camera based on user input for moving the virtual camera and a rail constraint that restricts movement of the virtual camera by user input to movement between positions on a virtual rail; and means for displaying another virtual rail in response to a change in position of an object within the area subject to image capturing by the plurality of cameras, the other virtual rail being associated with another rail constraint that restricts movement of the virtual camera by user input to movement between positions on the other virtual rail.

18. A system for controlling a virtual camera for a free viewpoint image generated based on images of an area captured from different directions by a plurality of cameras, the system comprising:

a memory for storing data and a computer program;

a processor coupled to the memory for executing the computer program, the computer program having instructions for:

controlling the virtual camera based on user input for moving the virtual camera and a rail constraint that restricts movement of the virtual camera by user input to movement between positions on a virtual rail; and displaying another virtual rail in response to a change in position of an object within the area subject to image capturing by the plurality of cameras, the other virtual rail being associated with another rail constraint that restricts movement of the virtual camera by user input to movement between positions on the other virtual rail.

19. A non-transitory computer readable medium having a computer program stored on the medium for controlling a virtual camera for a free viewpoint image generated based on images of an area captured from different directions by a plurality of cameras, the program comprising:

code for controlling the virtual camera based on user input for moving the virtual camera and a rail constraint that restricts movement of the virtual camera by user input to movement between positions on a virtual rail; and code for displaying another virtual rail, in response to a change in position of an object within the area subject to image capturing by the plurality of cameras, the other virtual rail being associated with another rail constraint that restricts movement of the virtual camera by user input to movement between positions on the other virtual rail.

* * * * *